US012202160B2

(12) United States Patent
Chang

(10) Patent No.: US 12,202,160 B2
(45) Date of Patent: *Jan. 21, 2025

(54) RAZOR ASSEMBLY

(71) Applicant: DORCO CO., LTD., Seoul (KR)

(72) Inventor: Junsoo Chang, Seoul (KR)

(73) Assignee: DORCO CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,521

(22) Filed: Aug. 17, 2023

(65) Prior Publication Data

US 2023/0398707 A1 Dec. 14, 2023

Related U.S. Application Data

(63) Continuation of application No. 17/185,710, filed on Feb. 25, 2021, now Pat. No. 11,766,796, which is a (Continued)

(30) Foreign Application Priority Data

Nov. 21, 2017 (KR) ........................ 10-2017-0155834
Aug. 21, 2018 (KR) ........................ 10-2018-0097323

(51) Int. Cl.
*B26B 21/52* (2006.01)
*B26B 21/22* (2006.01)
*B26B 21/44* (2006.01)

(52) U.S. Cl.
CPC .......... *B26B 21/521* (2013.01); *B26B 21/225* (2013.01); *B26B 21/443* (2013.01); *B26B 21/522* (2013.01)

(58) Field of Classification Search
CPC ......... B26B 21/06; B26B 21/14; B26B 21/22; B26B 21/225; B26B 21/40; B26B 21/4012; B26B 21/52; B26B 21/521
(Continued)

(56) References Cited

U.S. PATENT DOCUMENTS 947,209 A 1/1910 Woods
1,015,575 A 1/1912 Meyer
(Continued)

FOREIGN PATENT DOCUMENTS

EP 2227360 9/2010
EP 3486050 5/2019
(Continued)

OTHER PUBLICATIONS

Office Action in Japanese Patent Application No. 2018-217044 issued on Jan. 9, 2024.

(Continued)

*Primary Examiner* — Jason Daniel Prone
(74) *Attorney, Agent, or Firm* — Knobbe, Martens, Olson & Bear, LLP

(57) ABSTRACT

A razor assembly includes a razor cartridge, a connecting head, a razor handle, and first and second magnets. The razor cartridge includes a blade housing for housing shaving blades. The connecting head has a first side detachably coupled to the razor cartridge. The razor handle is coupled to the connecting head to be rotatable about a rotational axis. The first magnet is disposed on a second side of the connecting head and co-rotates with the connecting head about the rotational axis. The second magnet is disposed at a fixed position on the razor handle and placed opposite to the first magnet at a neutral position such that the first and second magnets and razor handle are aligned with a longitudinal axis of the razor handle. Magnetic force between the first and second magnets biases the connecting head toward the neutral rotation position with respect to the razor handle.

9 Claims, 44 Drawing Sheets

Related U.S. Application Data continuation of application No. 16/197,049, filed on Nov. 20, 2018, now Pat. No. 10,974,403.

(58) Field of Classification Search
USPC ........................................ 30/47–51, 526, 527
See application file for complete search history.

(56) References Cited

U.S. PATENT DOCUMENTS

| | | | |
|---|---|---|---|
| 1,633,139 | A | 6/1927 | Staats-Oels |
| 1,639,441 | A | 8/1927 | Spahr |
| 1,694,337 | A | 12/1928 | Oberheim |
| 2,060,445 | A | 11/1936 | Ryley |
| 2,083,172 | A | 6/1937 | Smith |
| 2,194,815 | A | 3/1940 | Testi |
| 2,678,490 | A | 5/1954 | Winslow |
| 3,935,639 | A | 2/1976 | Terry et al. |
| 3,950,848 | A | 4/1976 | Goldstein |
| 3,950,849 | A | 4/1976 | Perry |
| 3,964,160 | A | 6/1976 | Gordon |
| 4,152,828 | A | 5/1979 | Lund |
| 4,475,286 | A | 10/1984 | Saito |
| 4,879,811 | A | 11/1989 | Cooney |
| 5,038,472 | A | 8/1991 | Derosa |
| 5,050,301 | A | 9/1991 | Apprille, Jr. |
| 5,070,614 | A | 12/1991 | Hardin et al. |
| 5,687,485 | A | 11/1997 | Shurtleff et al. |
| 5,761,814 | A | 6/1998 | Anderson et al. |
| 5,956,848 | A | 9/1999 | Tseng et al. |
| 5,956,851 | A | 9/1999 | Apprille et al. |
| 6,041,926 | A | 3/2000 | Petricca et al. |
| 6,052,903 | A | 4/2000 | Metcalf et al. |
| 6,115,924 | A | 9/2000 | Oldroyd |
| 6,185,822 | B1 | 2/2001 | Tseng et al. |
| 6,212,777 | B1 | 4/2001 | Gilder et al. |
| 6,442,839 | B1 | 9/2002 | Tseng et al. |
| 6,516,518 | B1 | 2/2003 | Garraway et al. |
| 6,612,040 | B2 | 9/2003 | Gilder |
| 6,615,498 | B1 | 9/2003 | King et al. |
| 6,684,513 | B1 | 2/2004 | Clipstone et al. |
| 7,363,715 | B2 | 4/2008 | Coffin et al. |
| 7,461,456 | B2 | 12/2008 | Tsushio et al. |
| 7,578,062 | B2 | 8/2009 | Blackburn |
| 8,745,882 | B2 | 6/2014 | Murgida et al. |
| 8,745,883 | B2 | 6/2014 | Murgida et al. |
| 8,789,282 | B2 | 7/2014 | Wilson et al. |
| 8,898,909 | B2 | 12/2014 | Schmitt |
| 9,259,846 | B1 | 2/2016 | Robertson |
| 9,550,303 | B2 | 1/2017 | Robertson et al. |
| 10,105,858 | B2 | 10/2018 | Robertson et al. |
| 10,406,707 | B2 | 9/2019 | Robertson et al. |
| 10,974,403 | B2 | 4/2021 | Chang |
| 11,766,796 | B2 * | 9/2023 | Chang .................. B26B 21/521 30/527 |
| 2008/0034592 | A1 | 2/2008 | Smith et al. |
| 2012/0291295 | A1 | 11/2012 | Braur |
| 2013/0291391 | A1 | 11/2013 | Stevens |
| 2015/0174776 | A1 | 6/2015 | Hawes |
| 2016/0107324 | A1 | 4/2016 | Robertson et al. |
| 2016/0121495 | A1 | 5/2016 | Johnson |
| 2016/0144520 | A1 | 5/2016 | Lee |
| 2016/0236365 | A1 | 8/2016 | Robertson et al. |
| 2016/0250764 | A1 | 9/2016 | Hashimoto |
| 2017/0173806 | A1 | 6/2017 | Lee |
| 2018/0079095 | A1 | 3/2018 | Robertson et al. |
| 2019/0152077 | A1 | 5/2019 | Kim |
| 2019/0152078 | A1 | 5/2019 | Jang |
| 2019/0152079 | A1 | 5/2019 | Chang |
| 2019/0255721 | A1 | 8/2019 | Psimadas et al. |
| 2019/0315006 | A1 | 10/2019 | Park et al. |
| 2020/0070376 | A1 | 3/2020 | Petratou et al. |
| 2020/0156274 | A1 | 5/2020 | Georgakis et al. |

FOREIGN PATENT DOCUMENTS

| | | |
|---|---|---|
| FR | 2660589 | 10/1991 |
| FR | 2663255 | 12/1991 |
| JP | S50-024877 Y | 7/1975 |
| JP | 11300065 | 11/1991 |
| JP | H04-22389 | 1/1992 |
| JP | 2000-300871 | 10/2000 |
| JP | 2011-502616 | 1/2011 |
| JP | 2017-531513 | 10/2017 |
| JP | 2019-093139 | 6/2019 |
| KR | 10-2010-0083175 | 7/2010 |
| KR | 10-2014-0050220 | 4/2014 |
| WO | WO 2004/076136 | 9/2004 |
| WO | WO 2009/066218 | 5/2009 |

OTHER PUBLICATIONS

Office Action dated Oct. 4, 2022 in Japanese Application No. 2018-217044, in 2 pages.

Search Report dated Feb. 1, 2019 in European Application No. 18207586.1, in 8 pages.

Office Action dated Jul. 30, 2019 in Korean Application No. 10-2018-0097323, in 3 pages.

Office Action dated Apr. 3, 2020 in Chinese Application No. 201811351090.3, in 6 pages.

* cited by examiner

[FIG. 1]
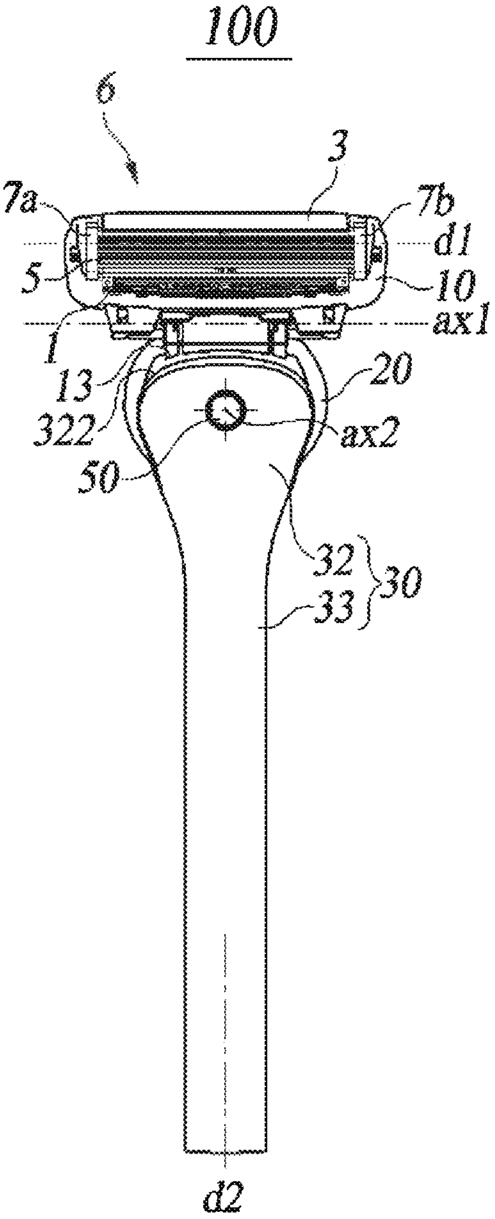

[FIG. 2]
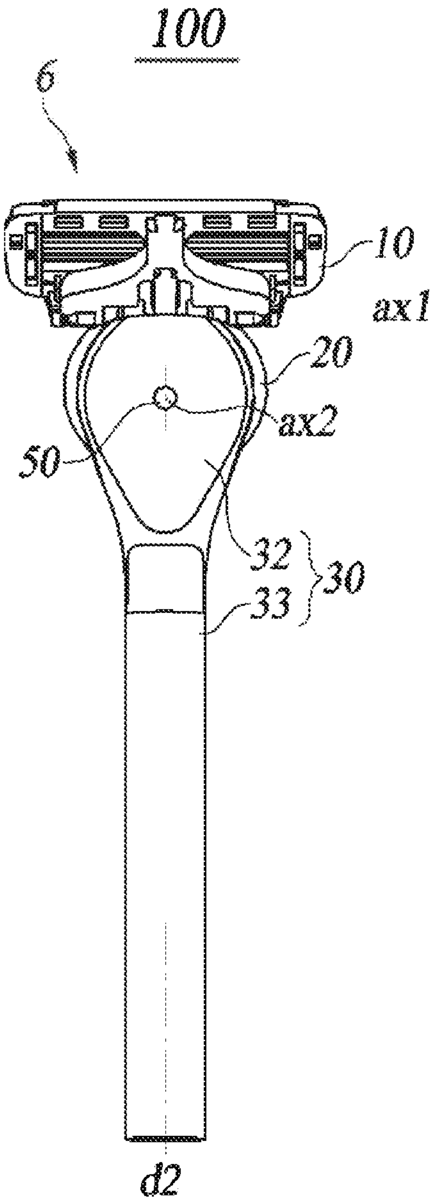

[FIG. 3]
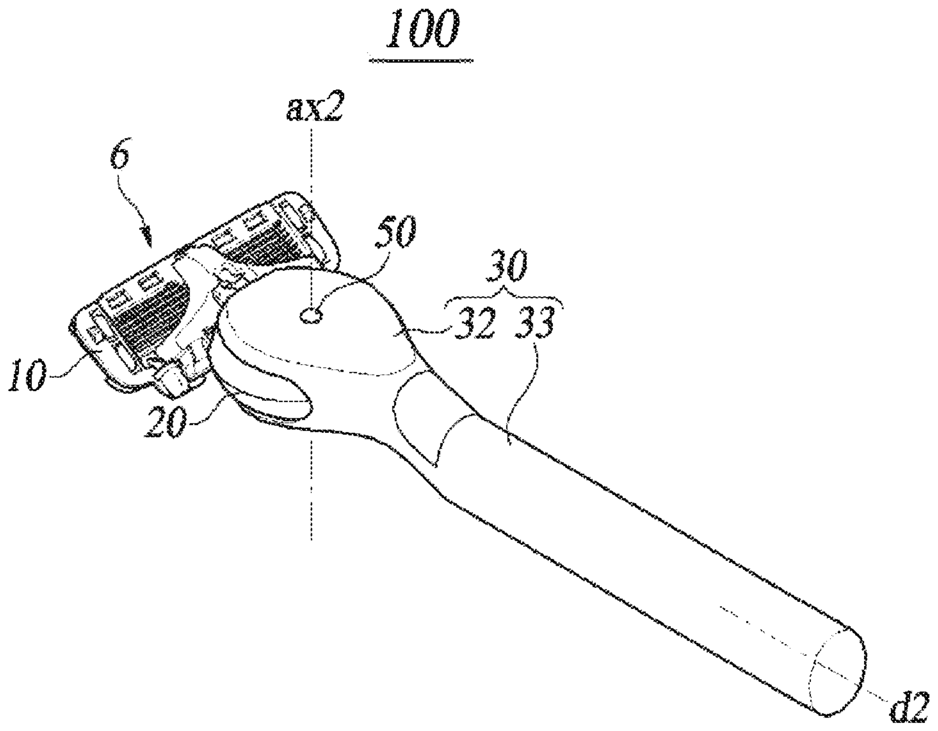
[FIG. 4]
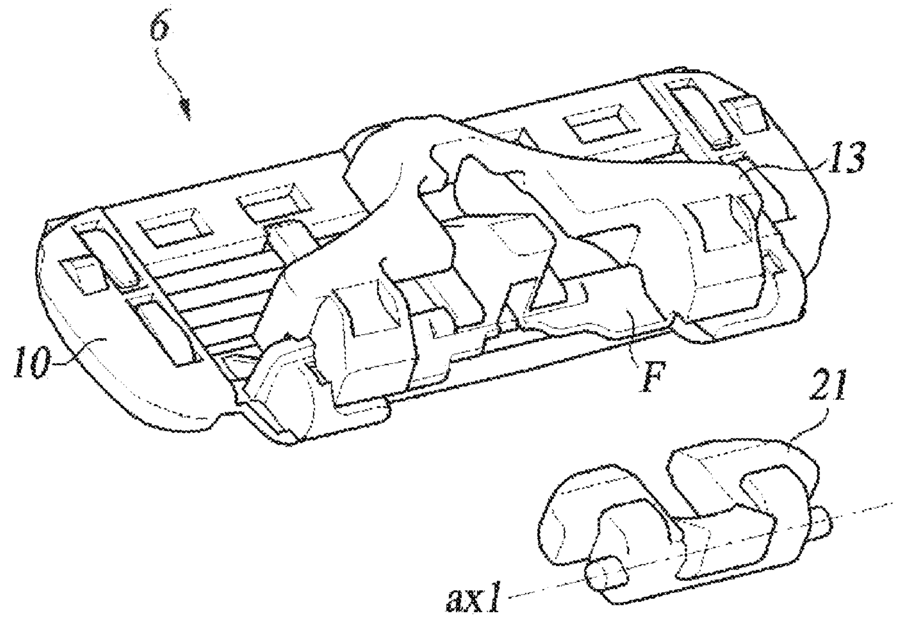

[FIG. 5]
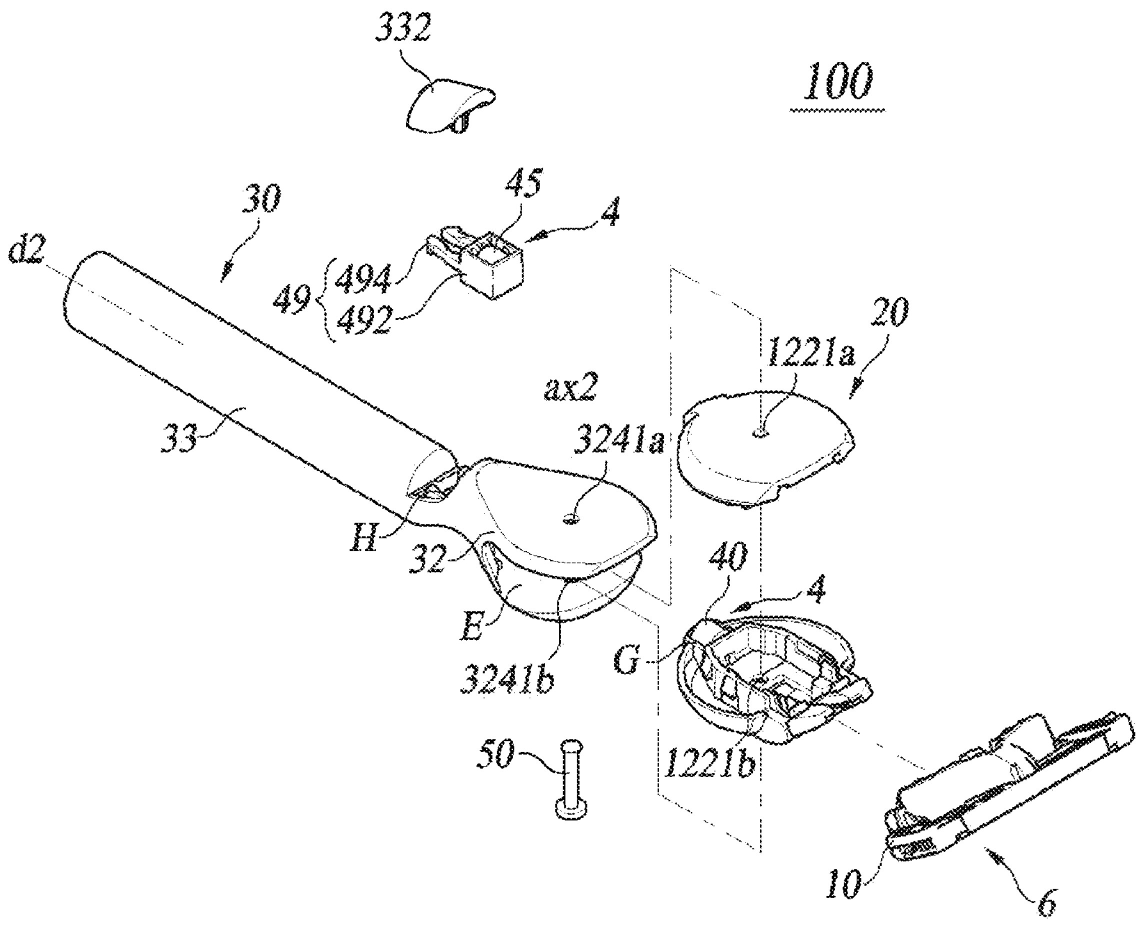

[FIG. 6]
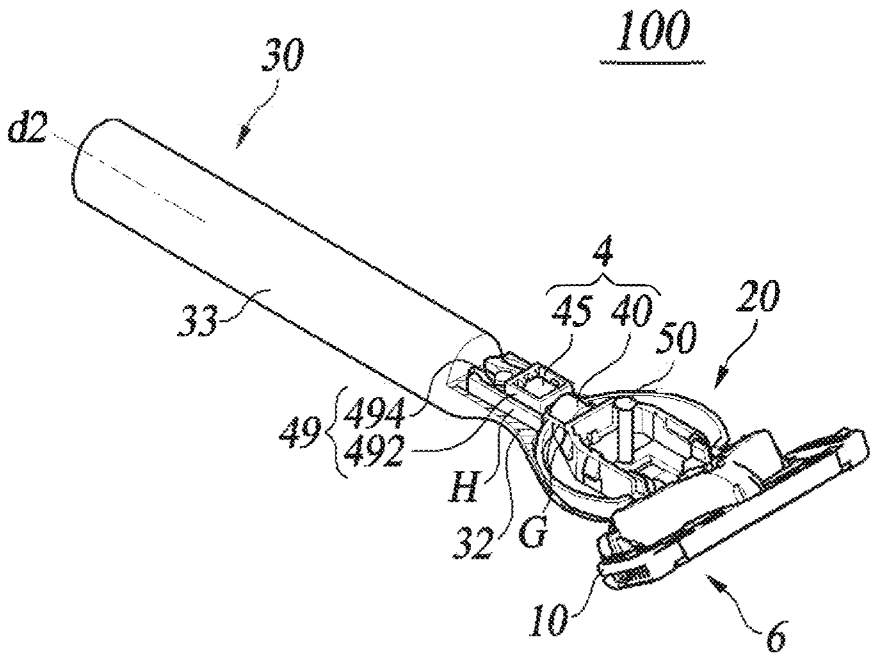

[FIG. 7]
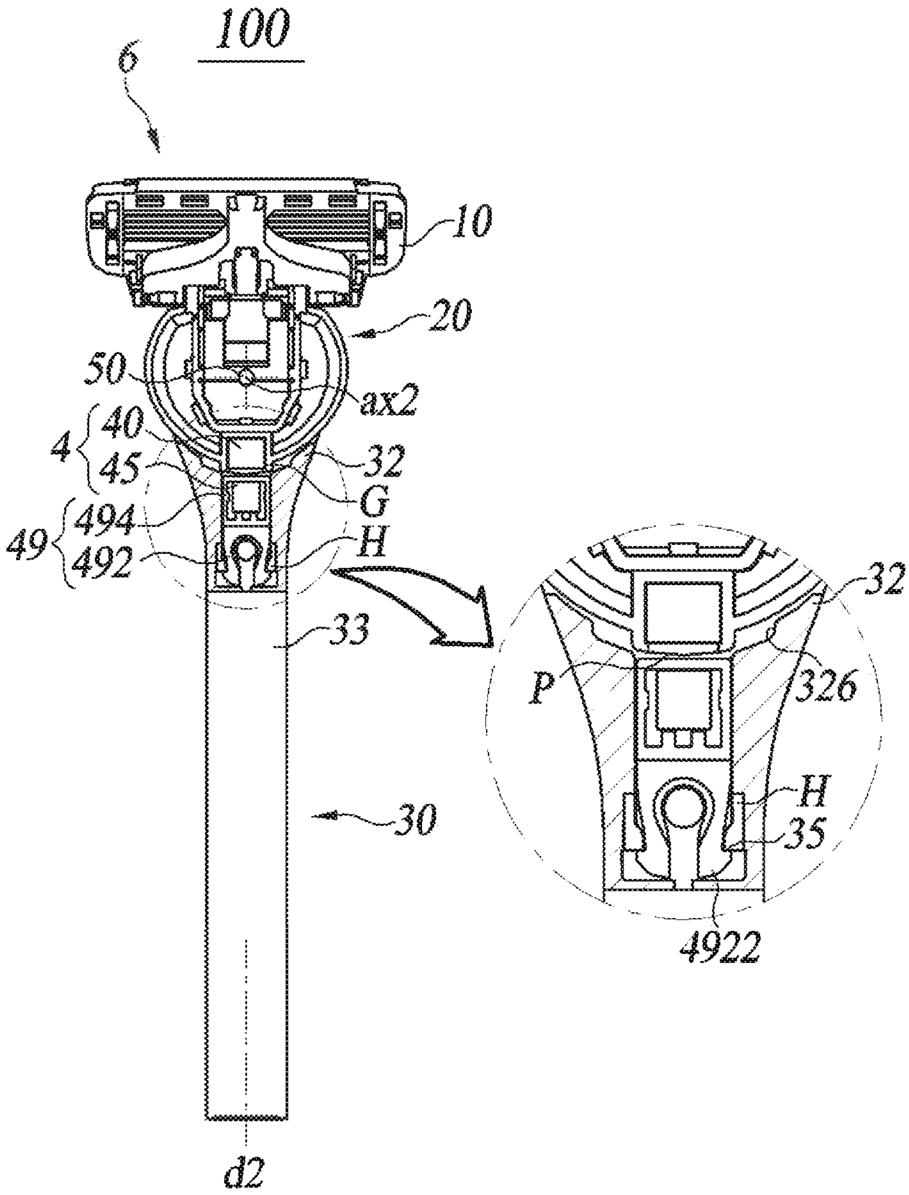

[FIG. 8]
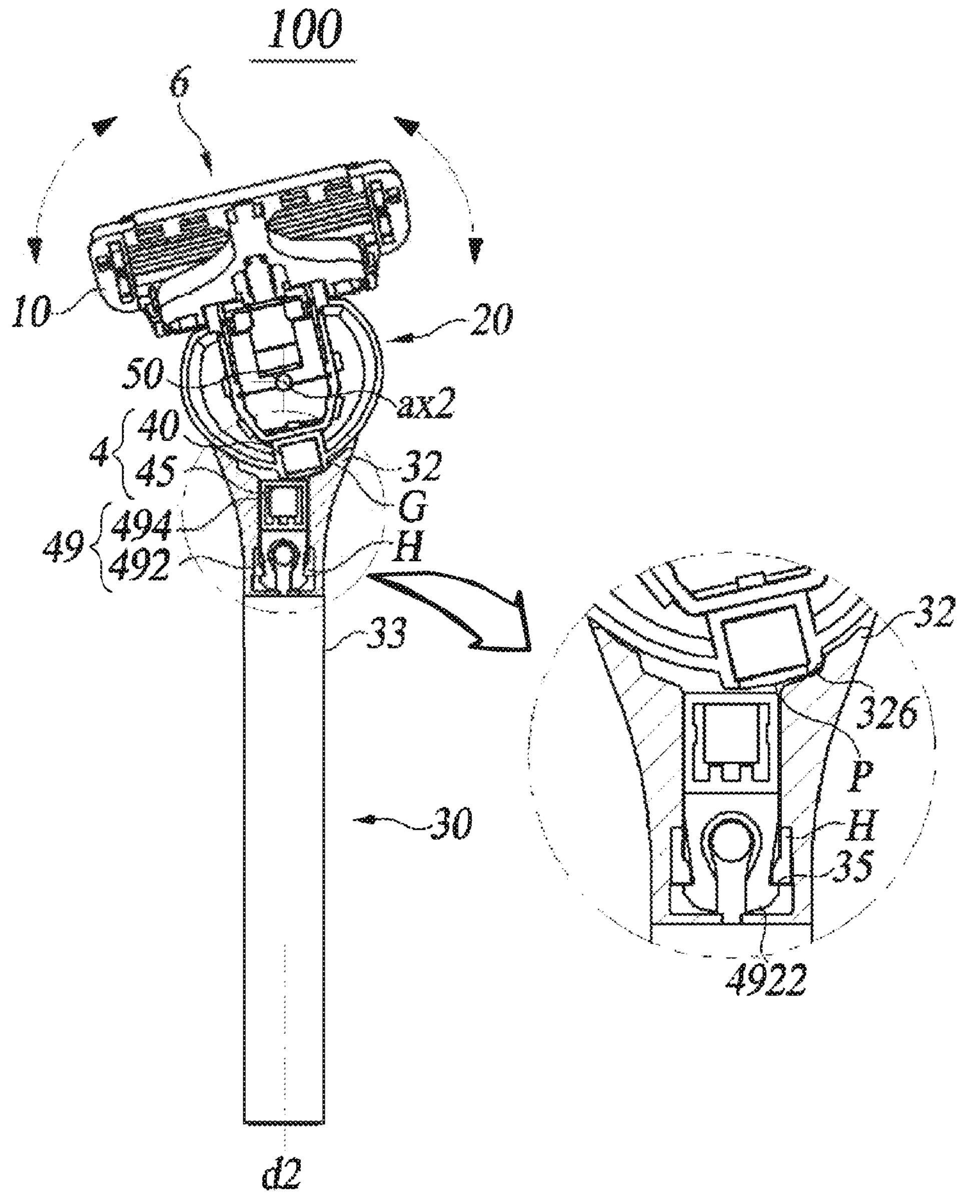

[FIG. 9]
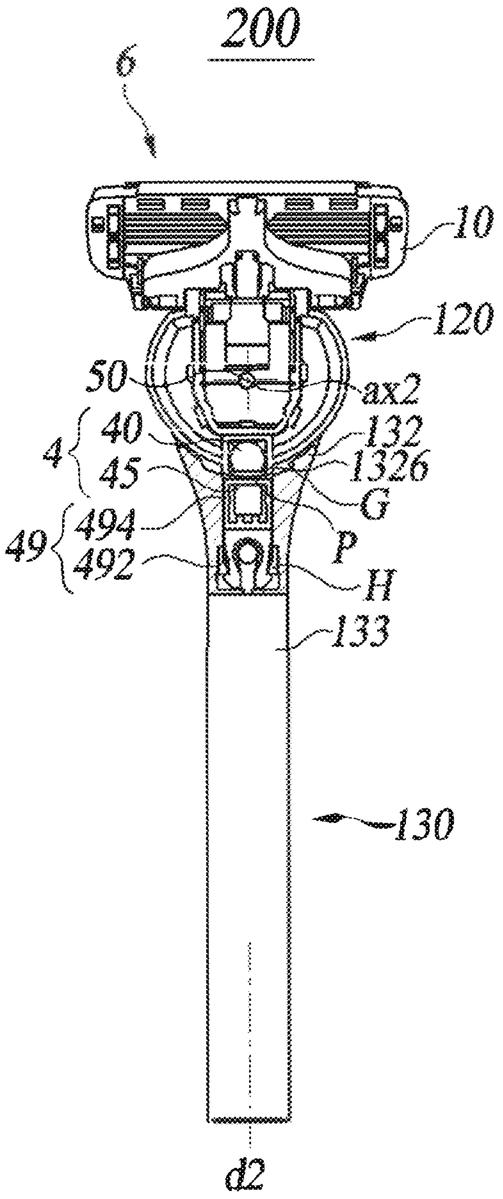

[FIG. 10]
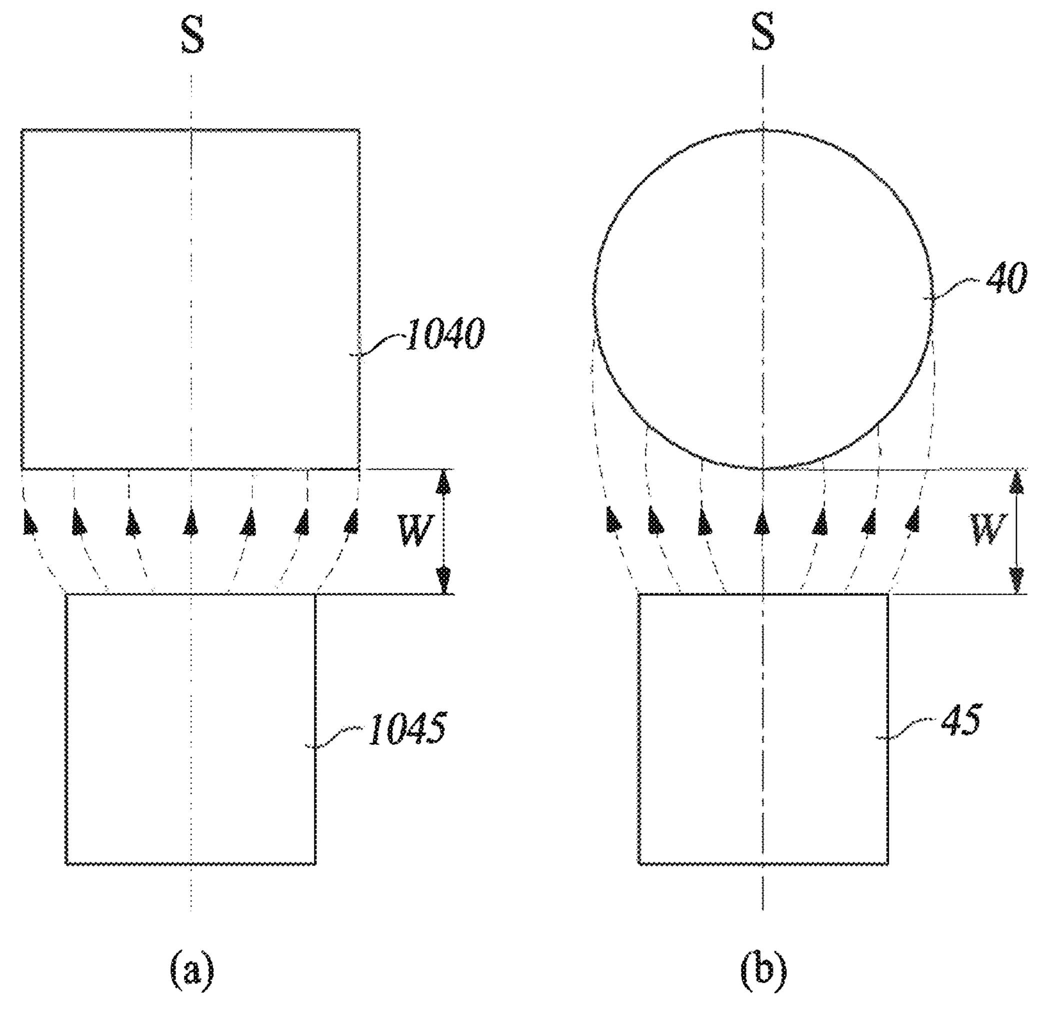

[FIG. 11]
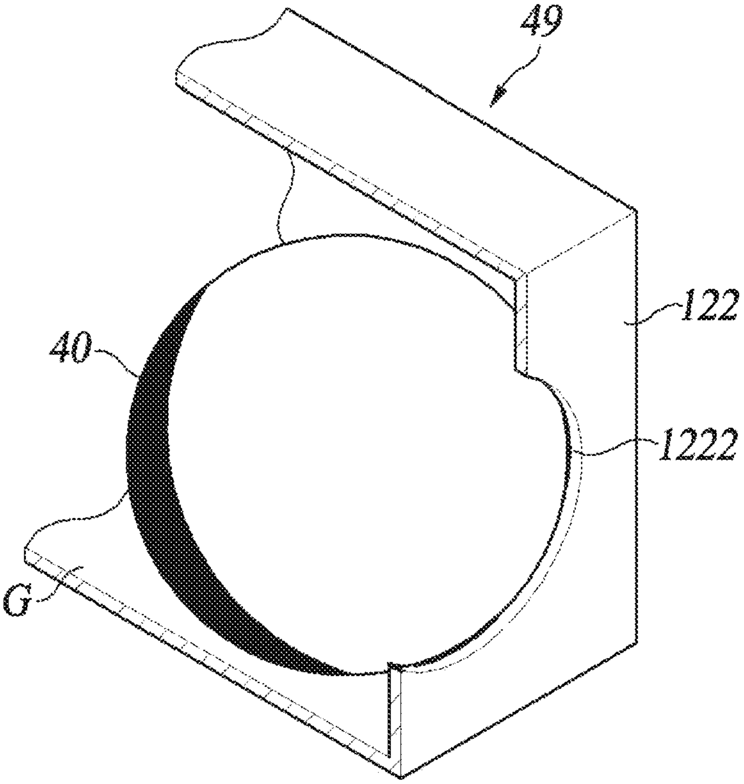

[FIG. 12]
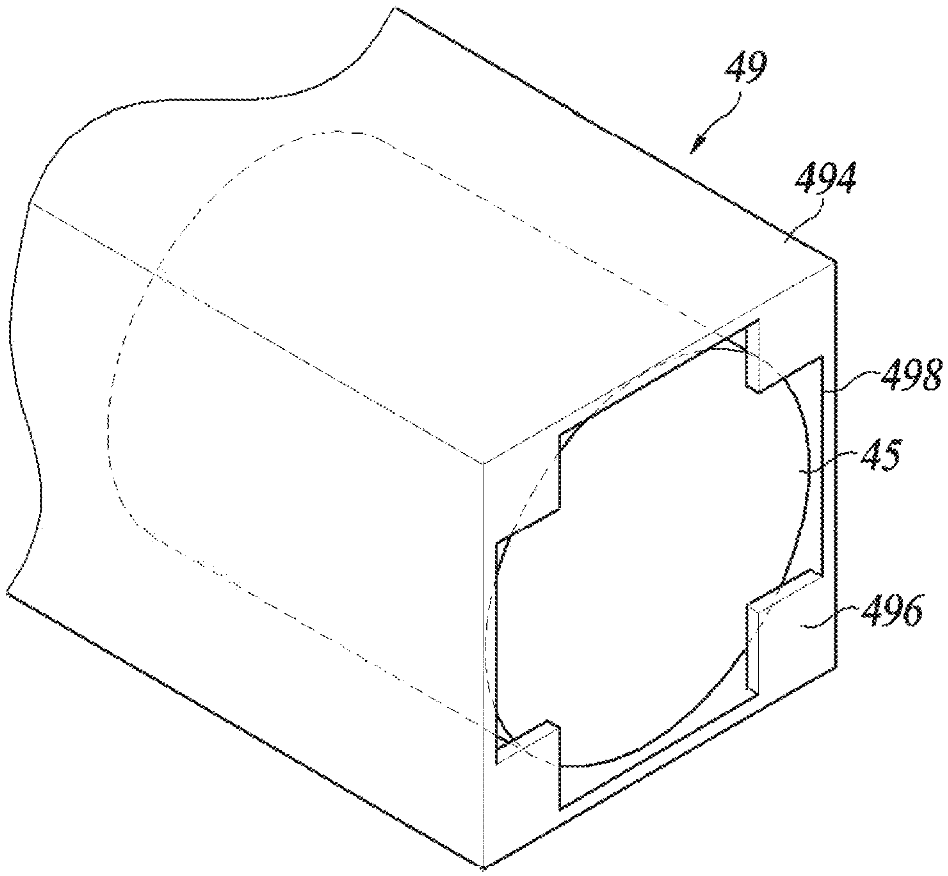

[FIG. 13A]
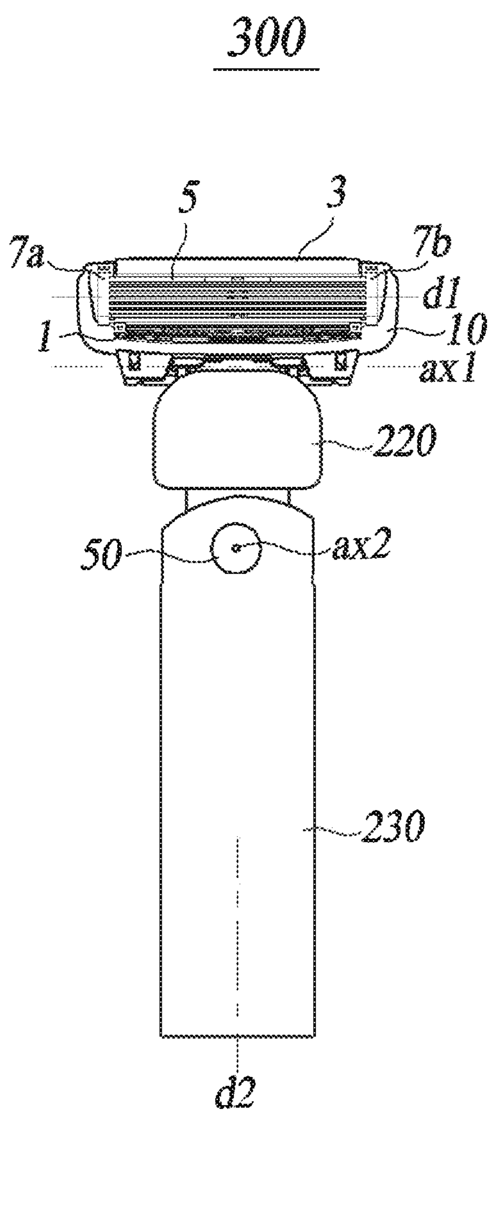

[FIG. 13B]
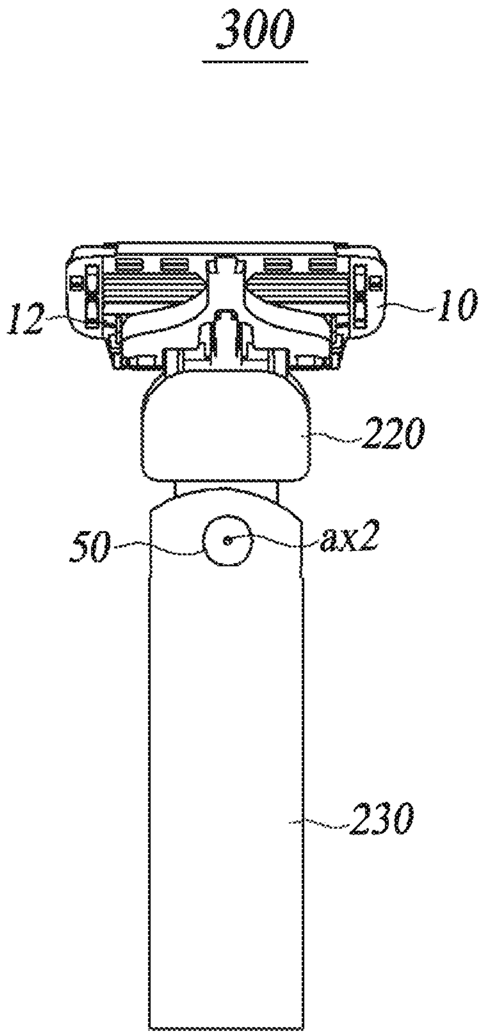

[FIG. 13C]
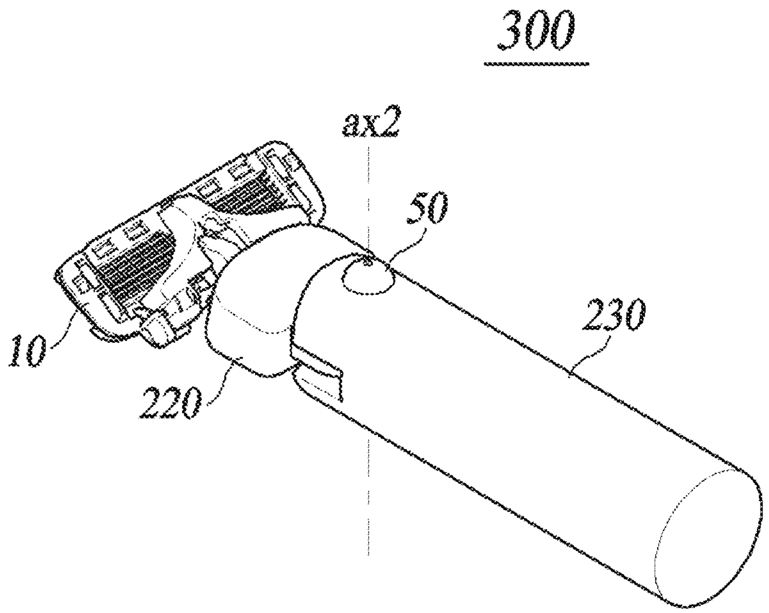
[FIG. 14]
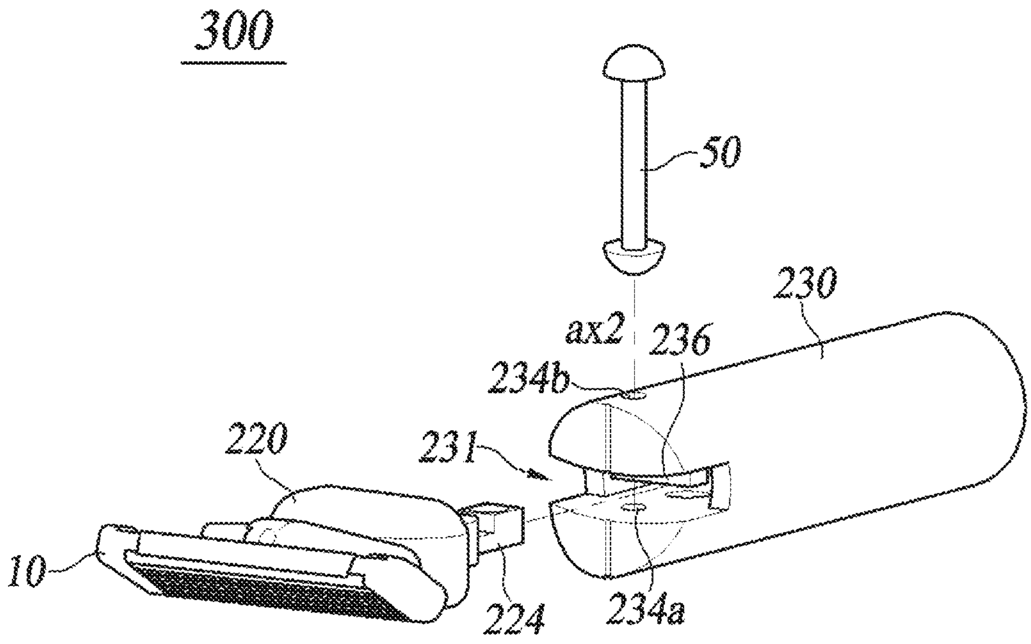

[FIG. 15]
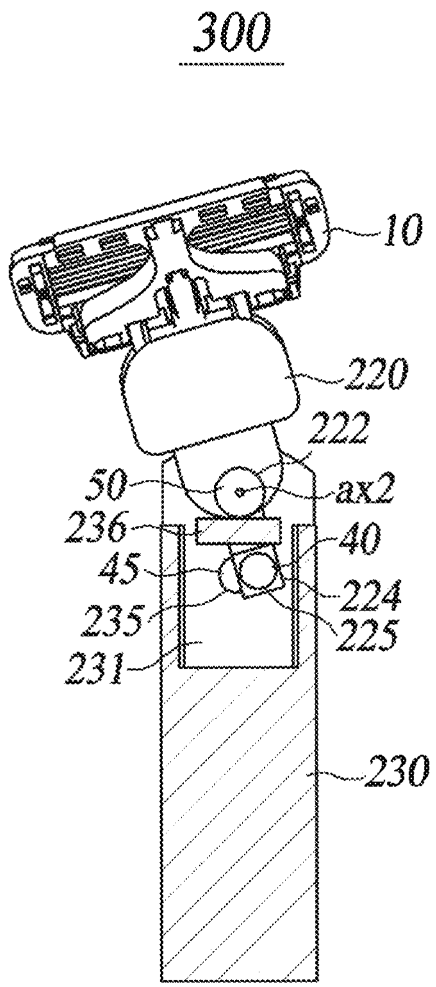

[FIG. 16A]
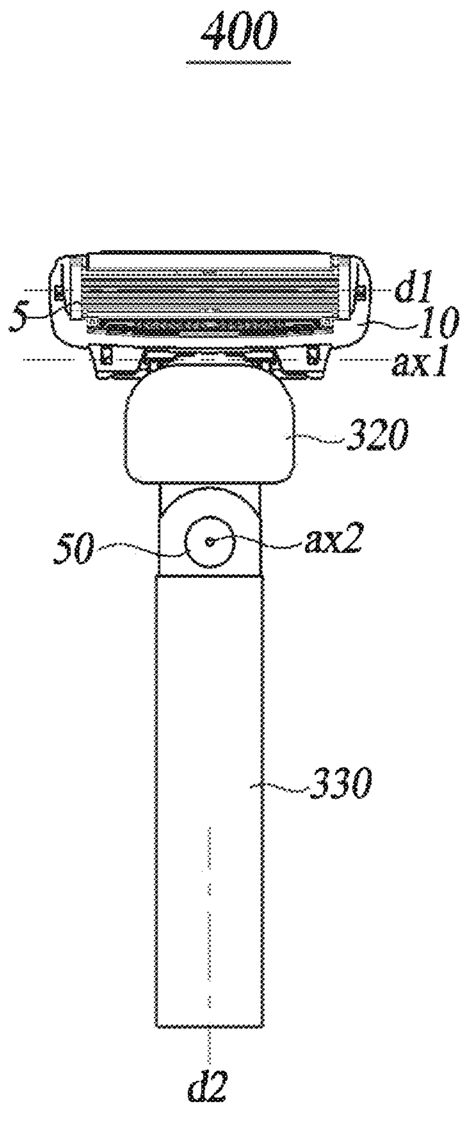

[FIG. 16B]
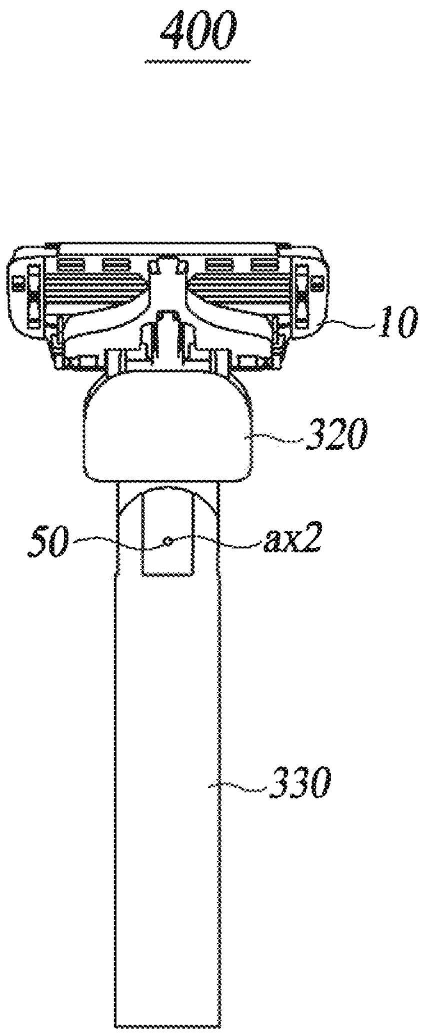

[FIG. 16C]
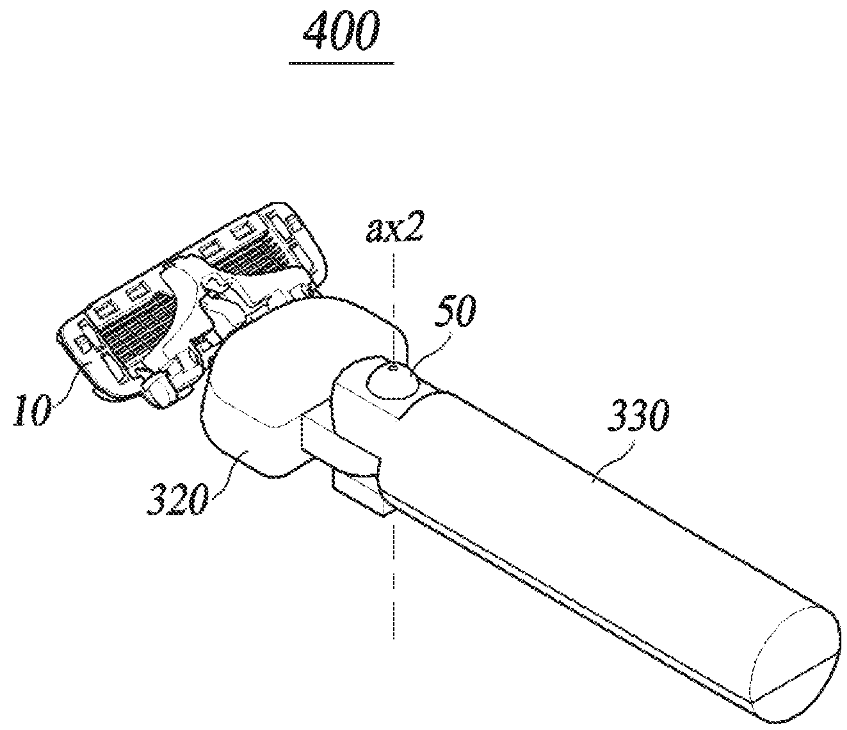

[FIG. 17A]
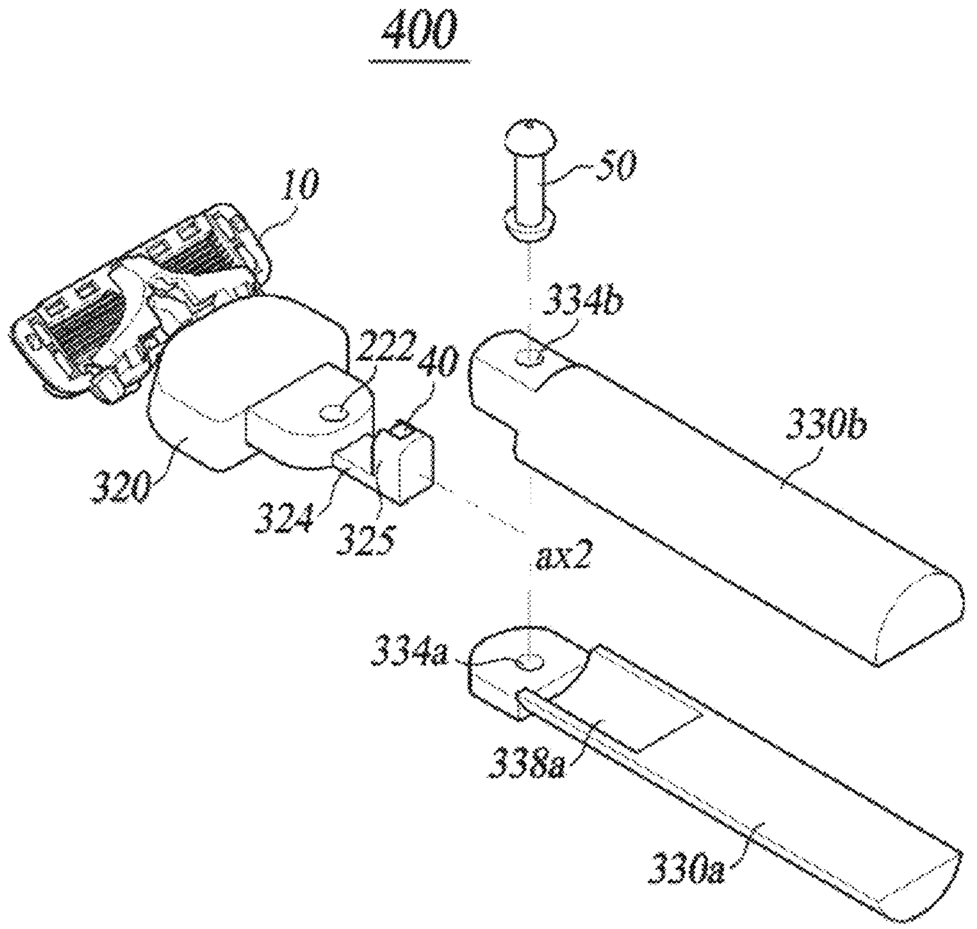

[FIG. 17B]
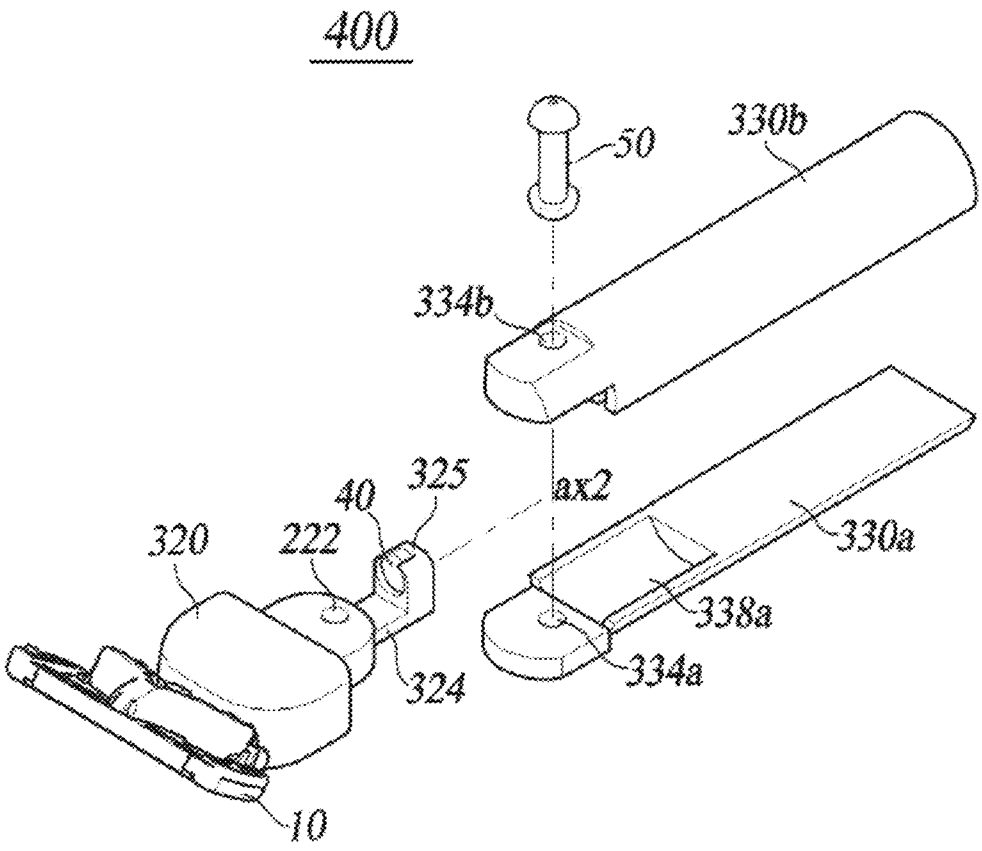

[FIG. 17C]
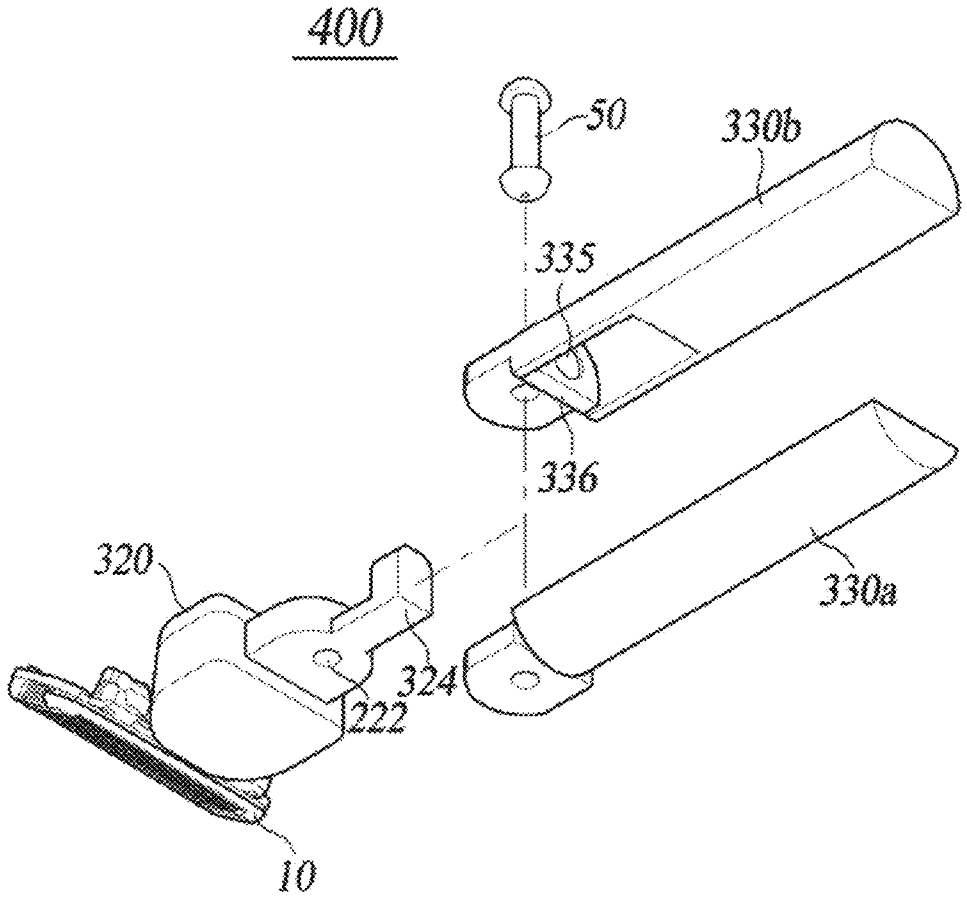

[FIG. 18]
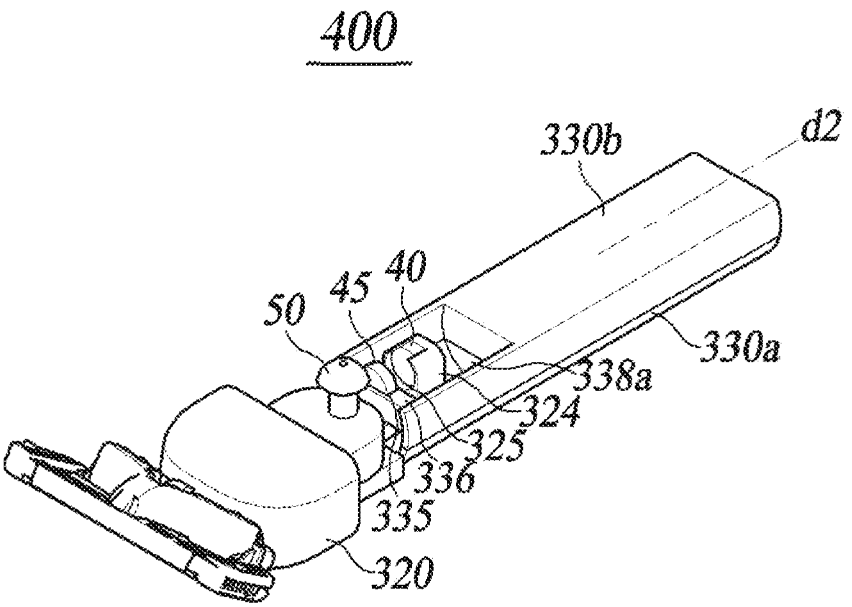

[FIG. 19A]
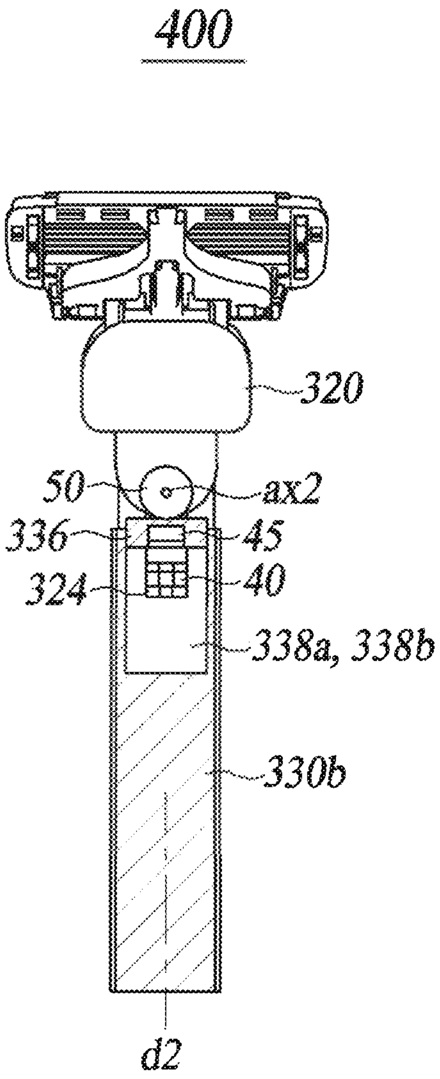

[FIG. 19B]
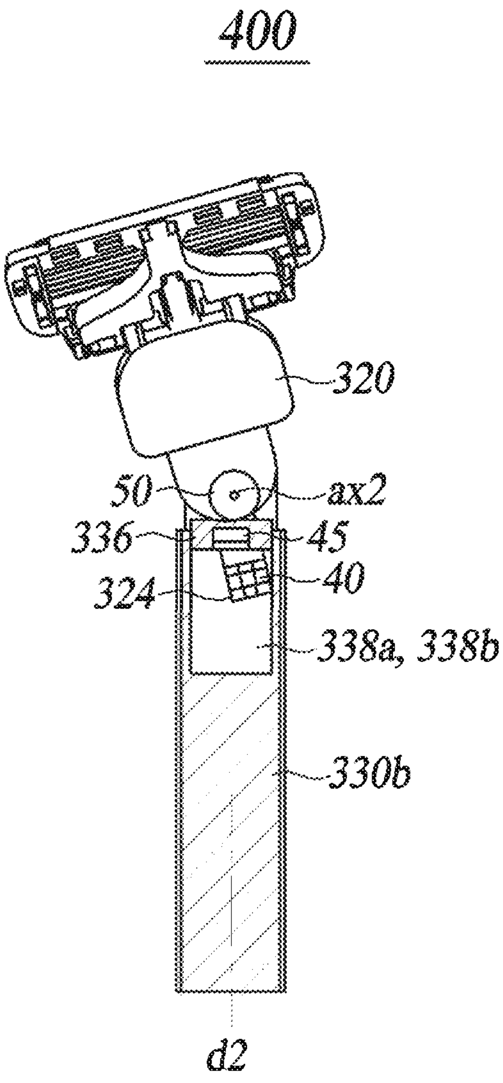

[FIG. 20]
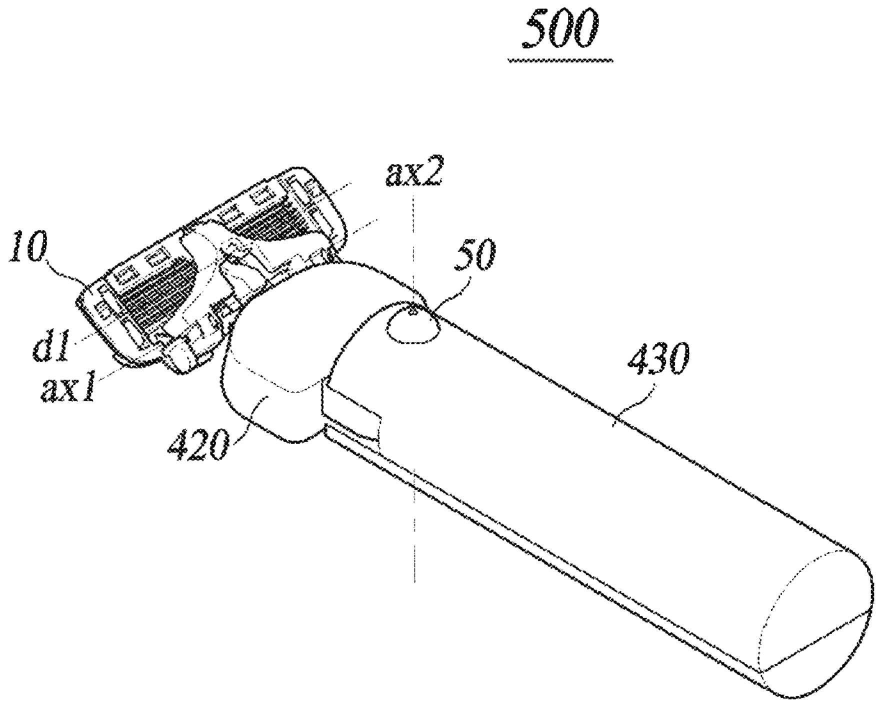

[FIG. 21A]
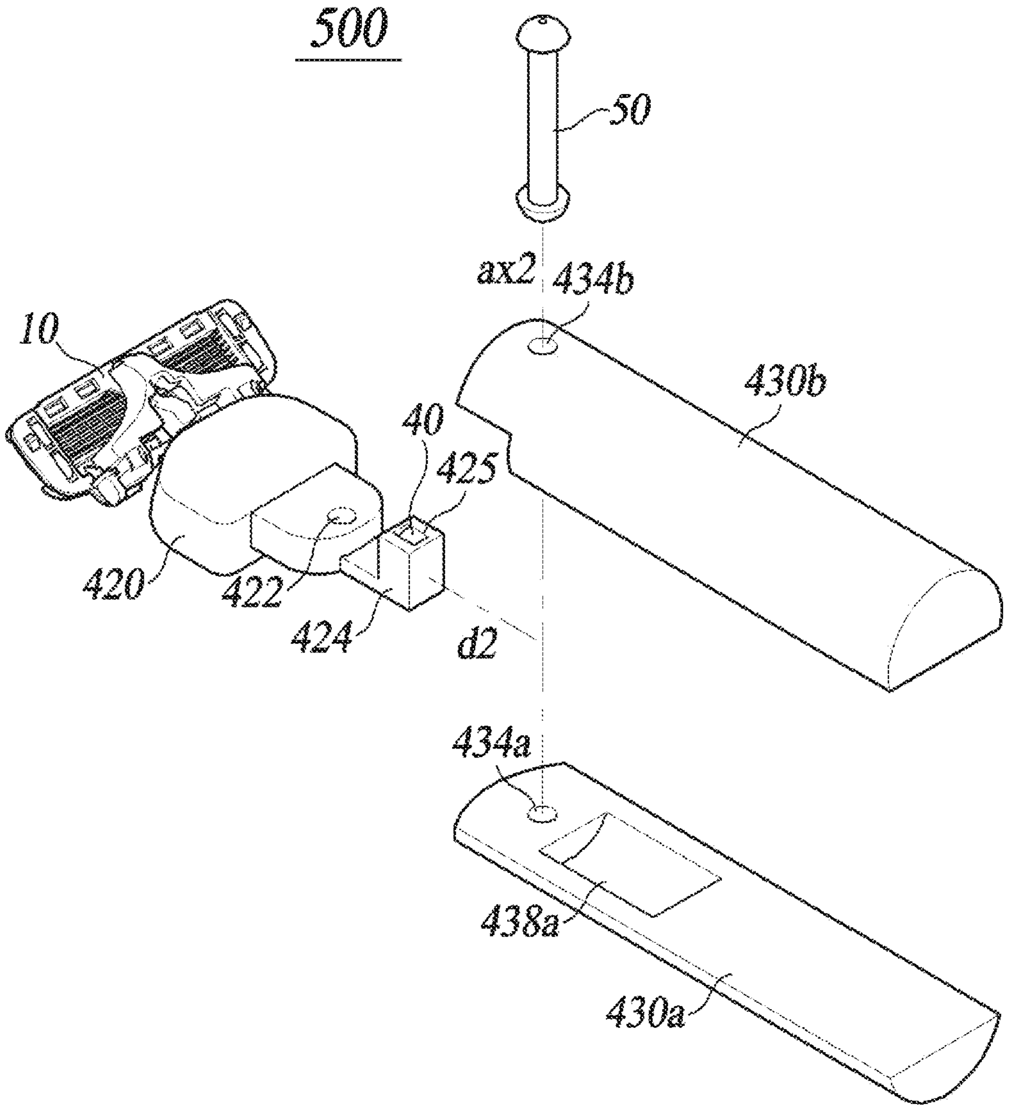

[FIG. 21B]
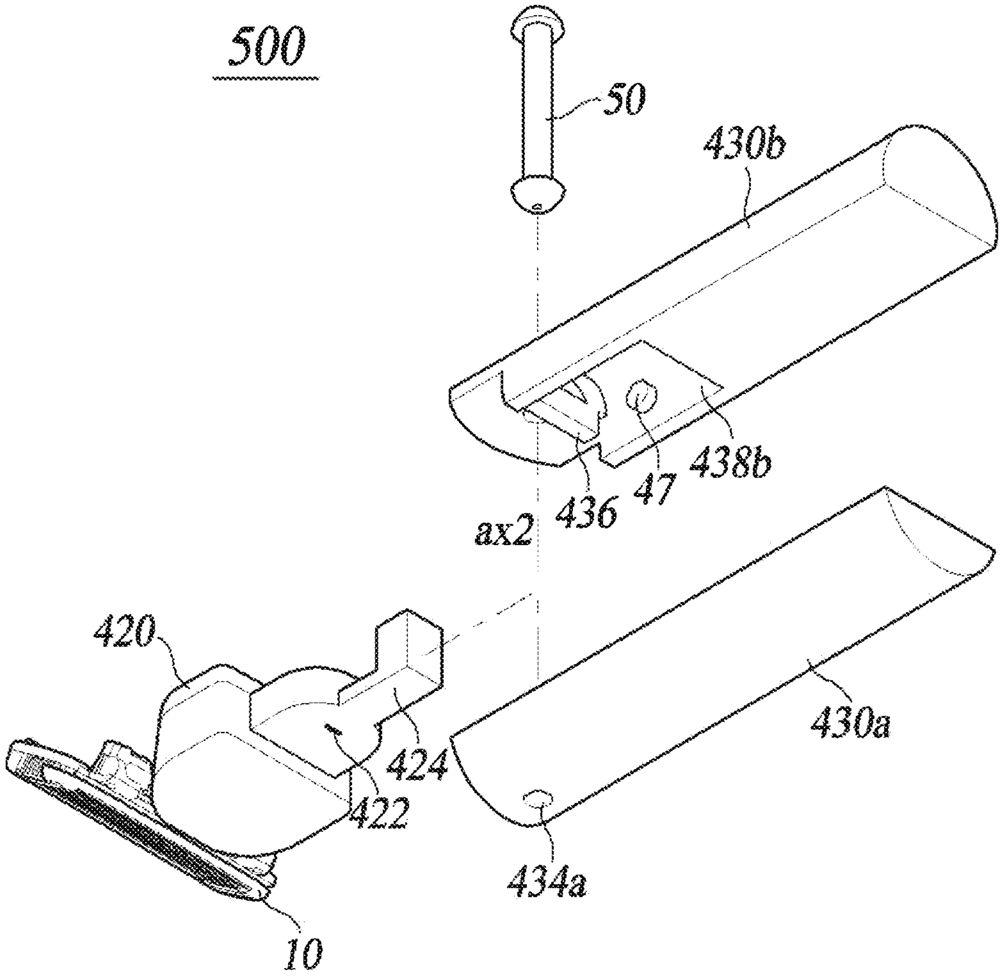

[FIG. 22A]
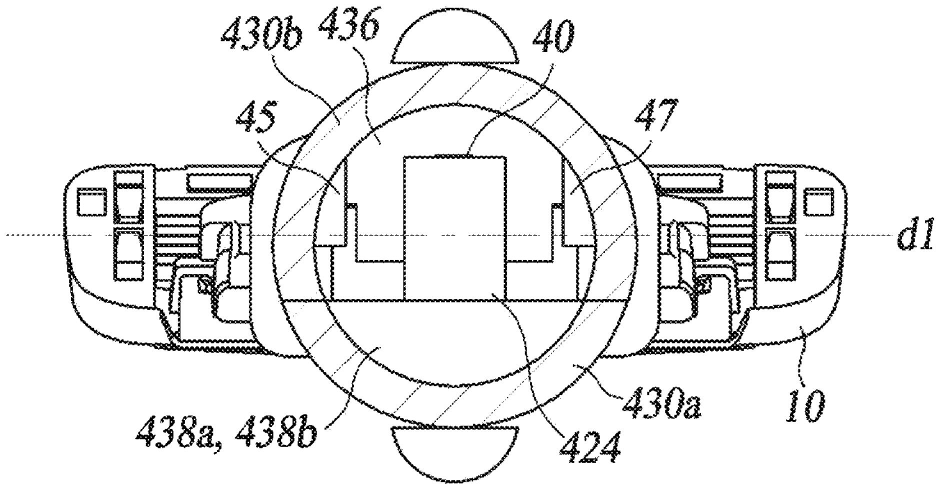
[FIG. 22B]
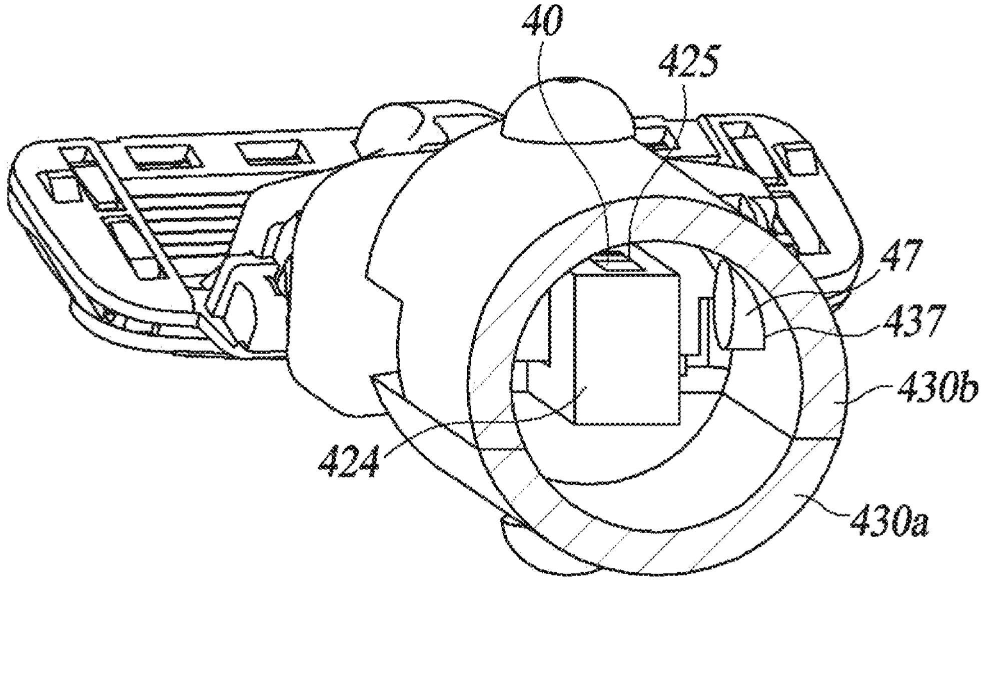

[FIG. 22C]
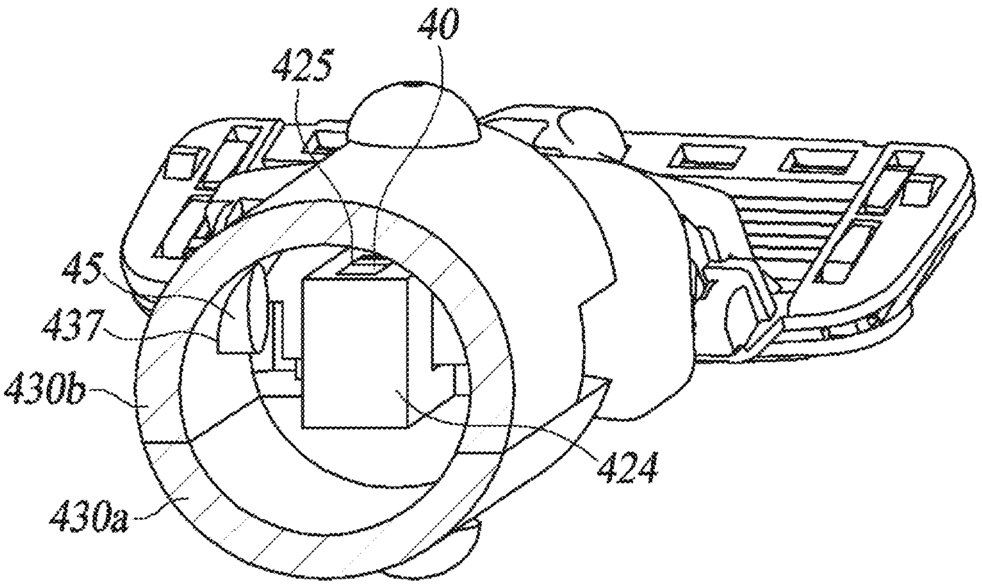

[FIG. 23A]
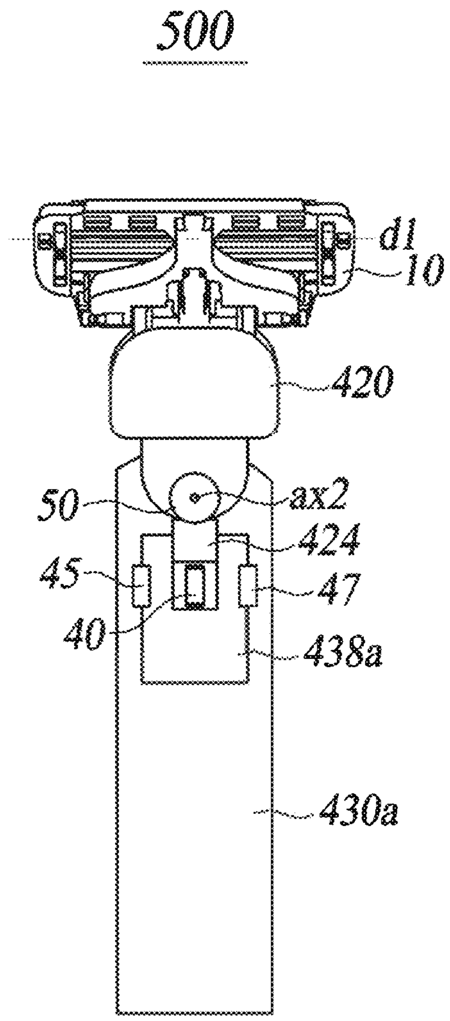

[FIG. 23B]
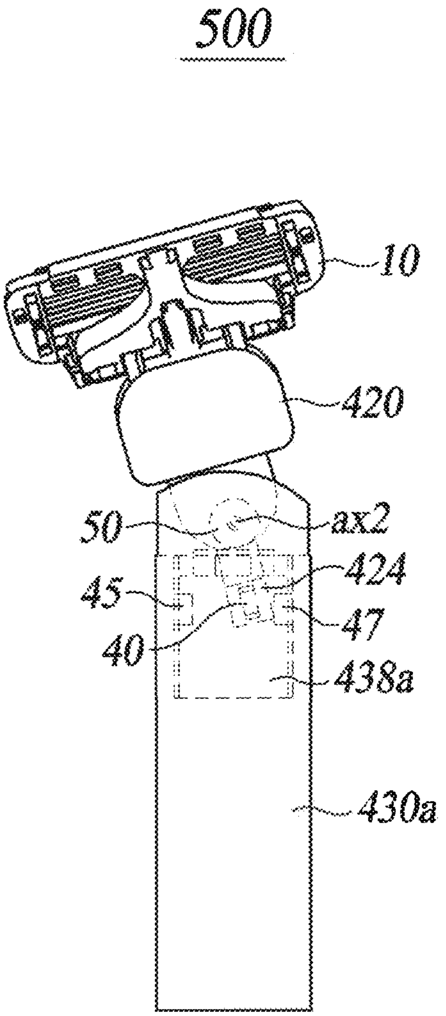
[FIG. 24]
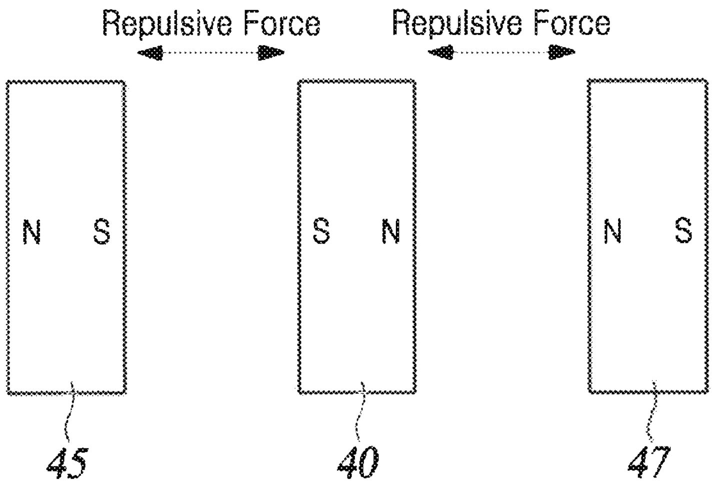

[FIG. 25A]
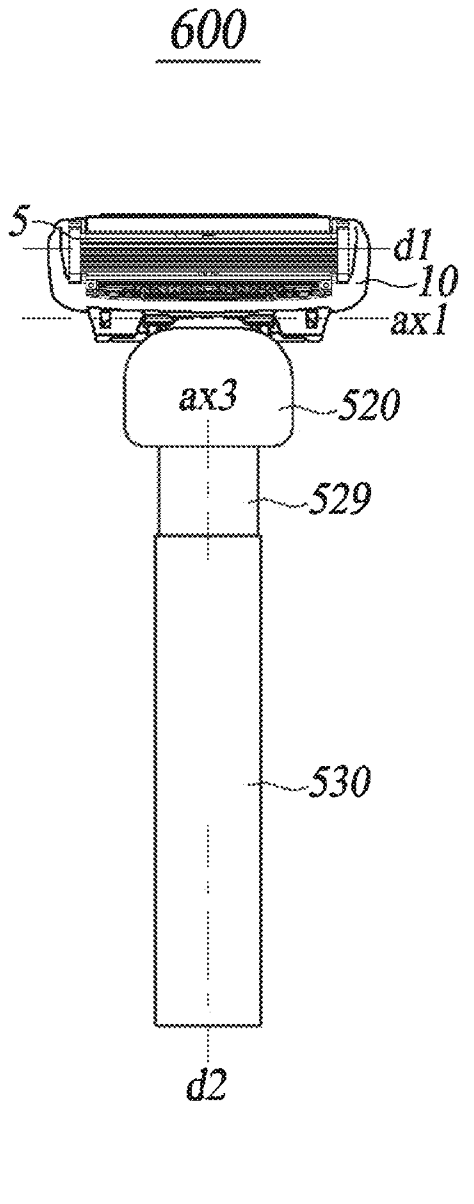

[FIG. 25B]
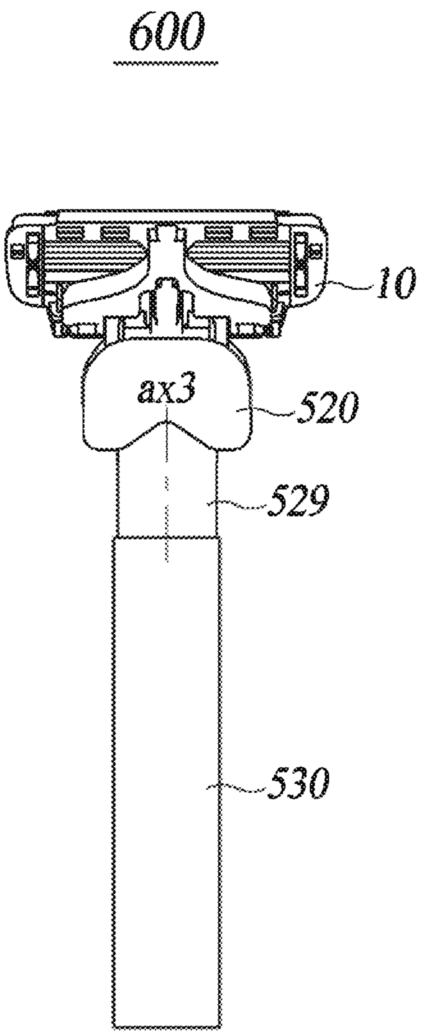

[FIG. 25C]
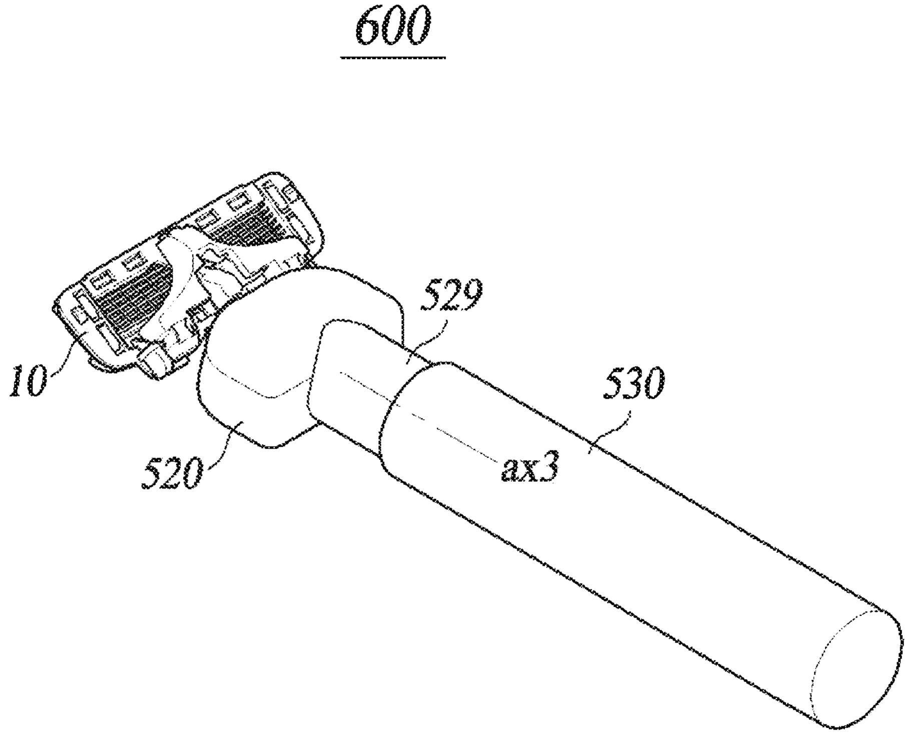

[FIG. 26]
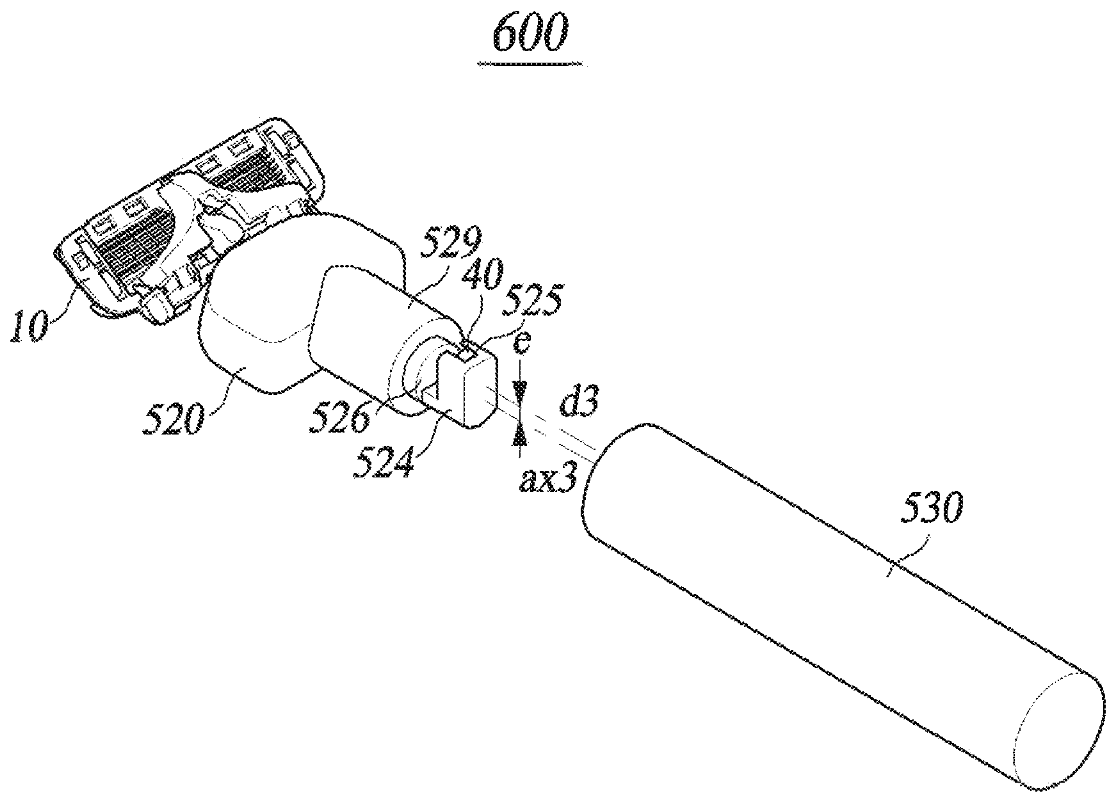

[FIG. 27A]
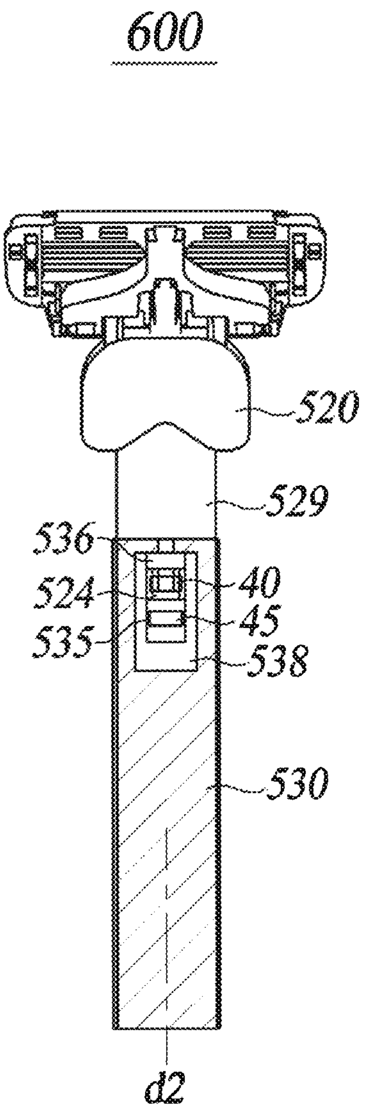

[FIG. 27B]
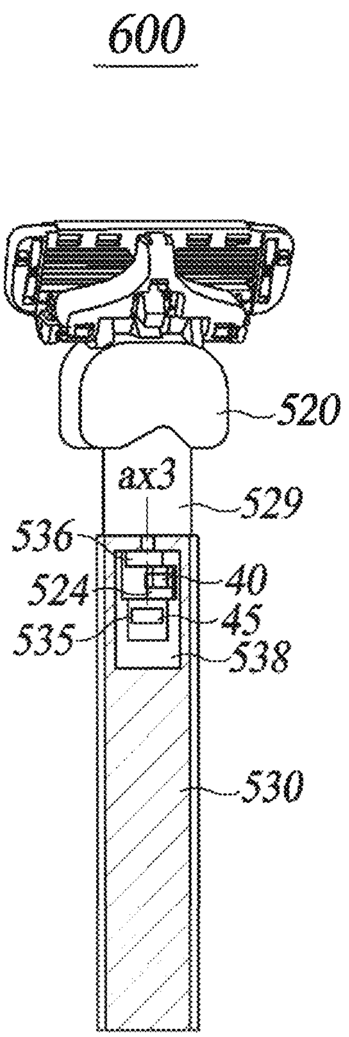

[FIG. 28]
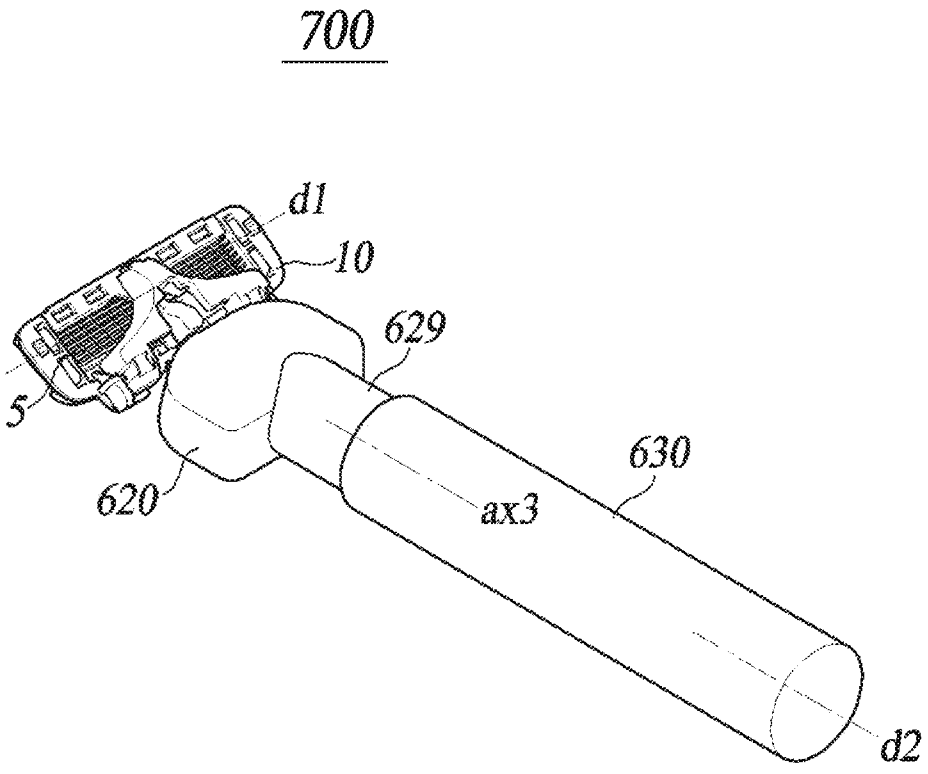

[FIG. 29A]
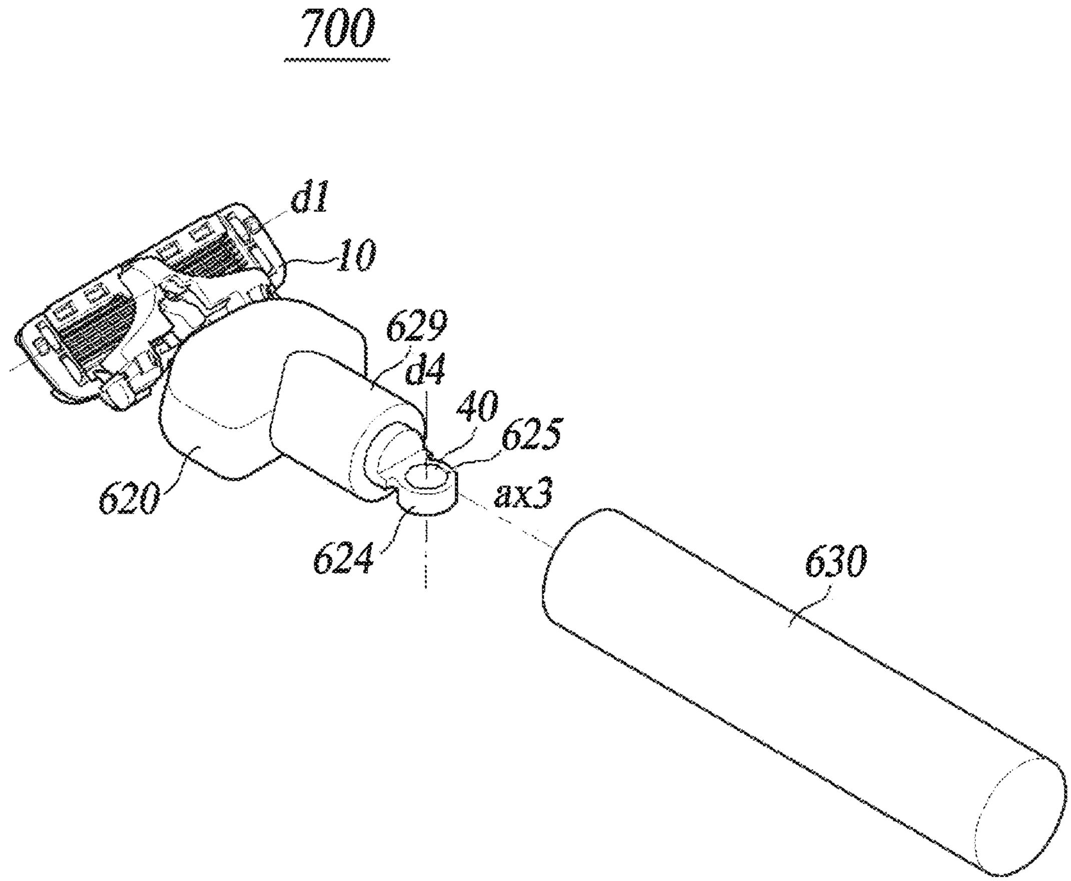

[FIG. 29B]
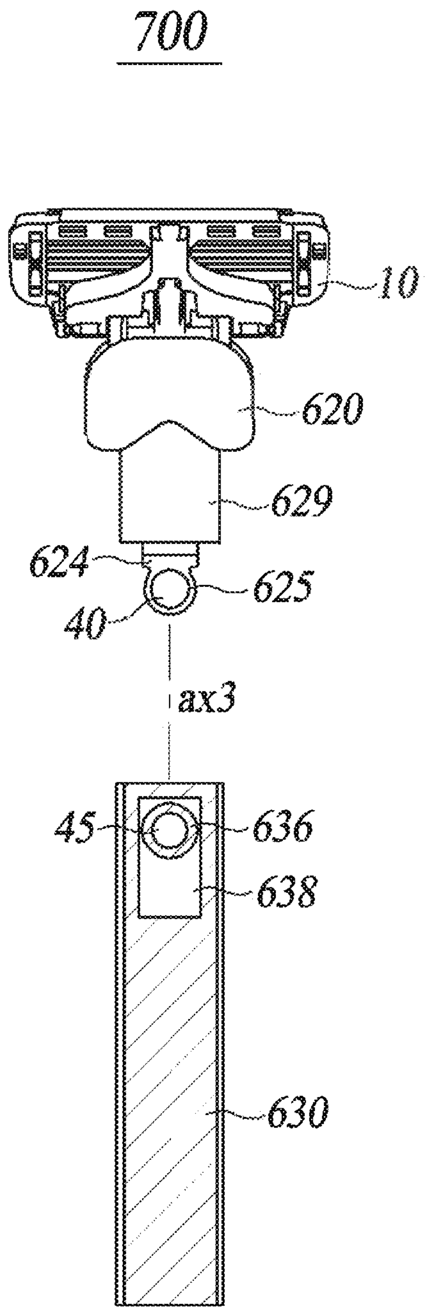

[FIG. 30A]
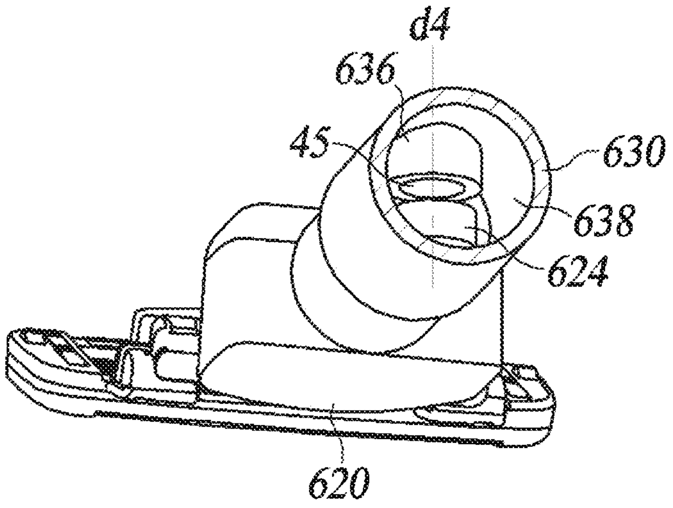
[FIG. 30B]
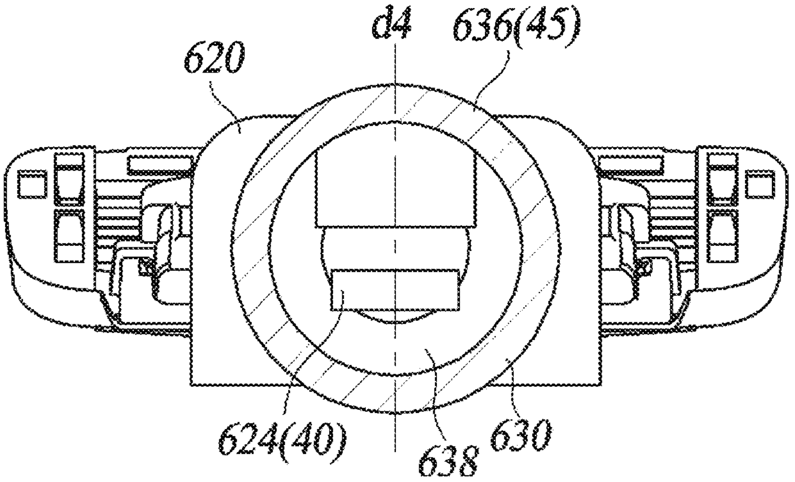

[FIG. 30C]
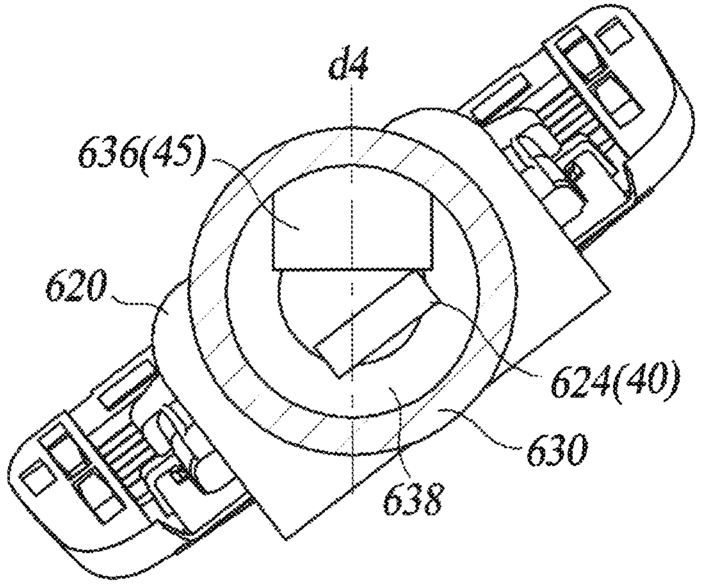
[FIG. 31]
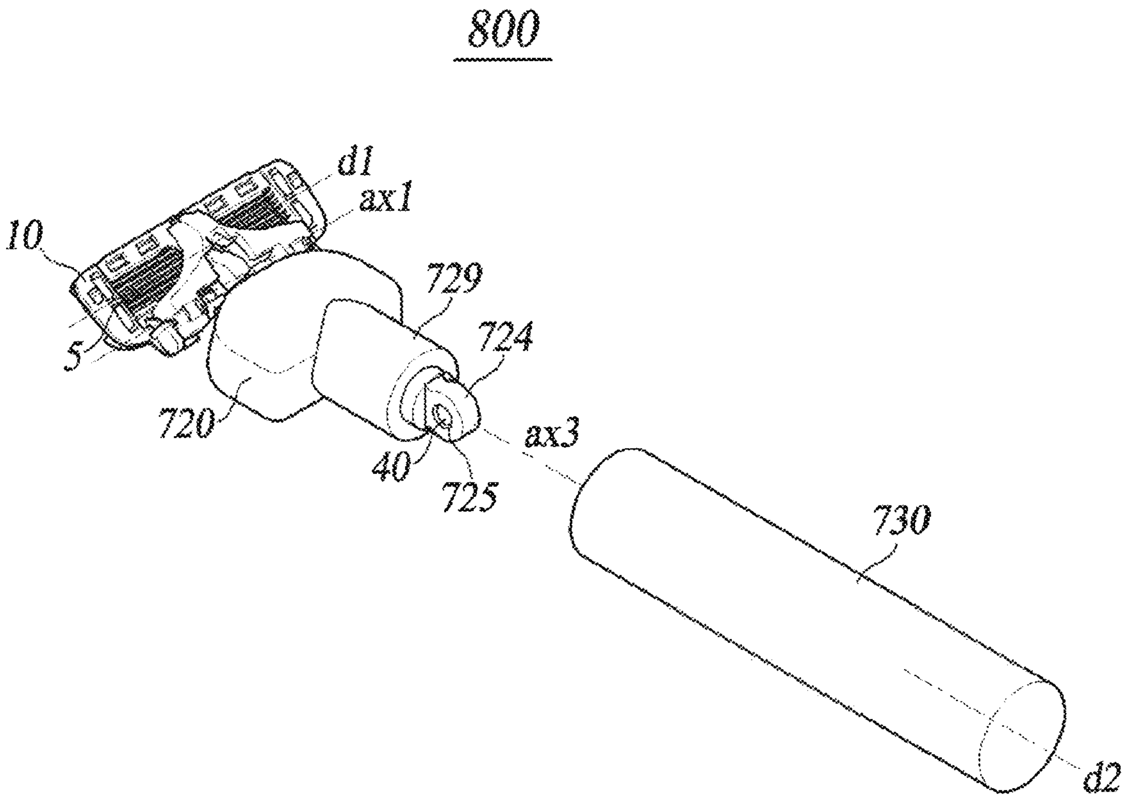

[FIG. 32A]
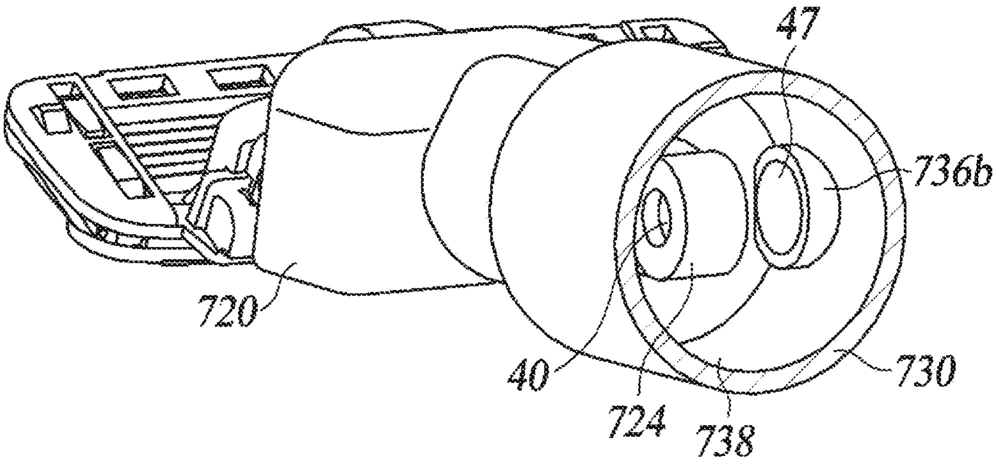
[FIG. 32B]
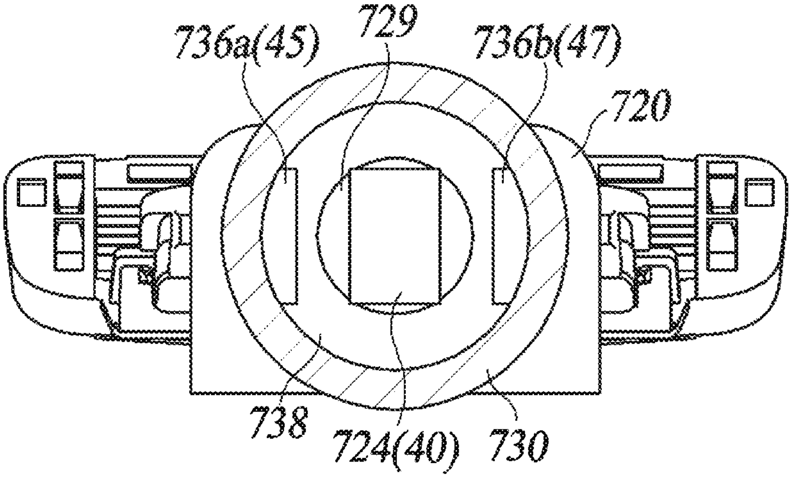

[FIG. 32C]
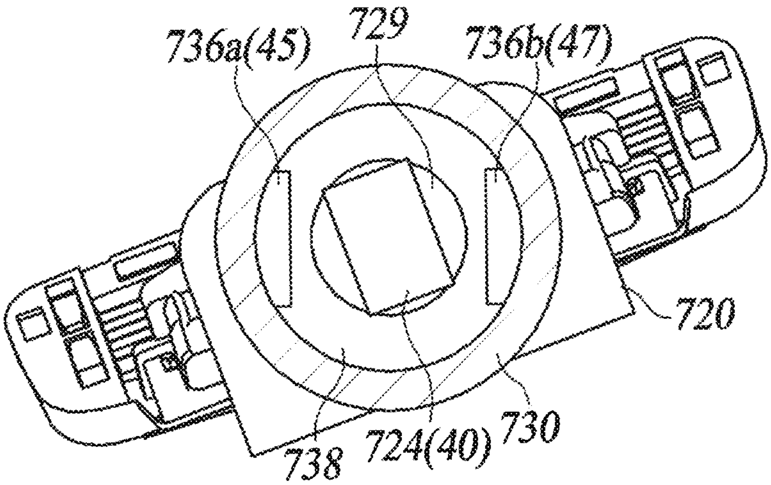
[FIG. 33]
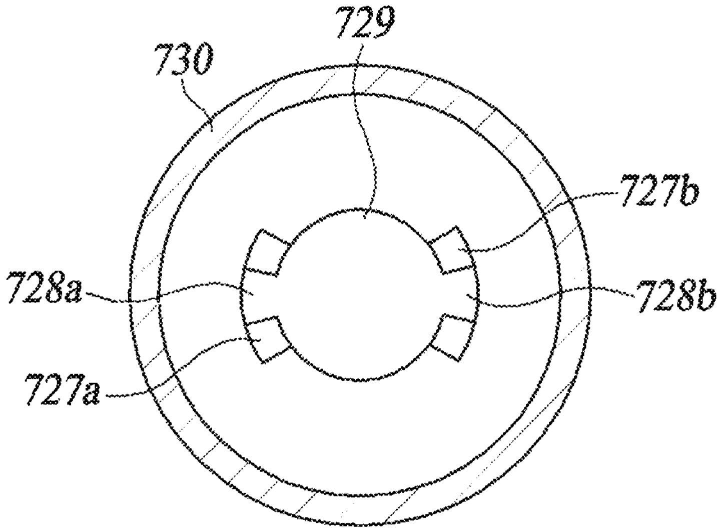

RAZOR ASSEMBLY

CROSS-REFERENCE TO RELATED APPLICATIONS

This application is a continuation of U.S. patent application Ser. No. 17/185,710, filed on Feb. 25, 2021, now U.S. Pat. No. 11,766,796, issued Sep. 26, 2023, which is a continuation of U.S. patent application Ser. No. 16/197,049, filed on Nov. 20, 2018, now U.S. Pat. No. 10,974,403, issued Apr. 13, 2021, which claims the benefit of earlier filing date and right of priority to Korean Patent Application Nos. 10-2017-0155834, filed on Nov. 21, 2017 and 10-2018-0097323, filed on Aug. 21, 2018, the contents of each of which are hereby incorporated by reference herein in their entireties.

BACKGROUND

Technical Field

The present disclosure relates to a razor assembly.

Description of Related Technology

The statements in this section merely provide background information related to the present disclosure and do not necessarily constitute prior art.

Generally, conventional razor assemblies known as wet razors include a razor cartridge and a razor handle. A razor cartridge includes a blade housing, a guard bar, a cap, and at least one shaving blade disposed between the guard bar and the cap.

The razor cartridge is configured to pivot or rotate about a razor handle between a rest position and a rotational position. The rotational or pivotal motion of the razor cartridge is basically carried out around a parallel rotation axis (hereinafter "parallel axis") that is parallel to the direction of the arrangement of the shaving blades.

Rotational motion about the parallel axis ensures an efficient shaving by providing a seamless contact between the shaving blades and the cutting surface, e.g., the user's skin.

Recently, in addition to a rotating function centered on the parallel axis, a multi-axis pivoting razor has been developed, incorporating therein a rotating function centered on a perpendicular rotation axis (hereinafter, "perpendicular axis") that is perpendicular to the parallel axis.

The multi-axis rotational razor is configured such that a razor cartridge is rotatable about two or more axes, allowing the shaving blade to move along the profile of the user's skin, promoting a smoother contact therebetween.

However, the multi-axis rotating razor may have somewhat complicated rotational structure for providing a rotating function about two axes or more, resulting in somewhat vulnerable rotational structure.

Therefore, a simple but reliable new rotational structure capable of providing a multi-axis rotational function is desired.

SUMMARY

In accordance with some embodiments, a razor assembly includes a razor cartridge, a connecting head, a razor handle and a restoring force provider. The razor cartridge includes at least one shaving blade having a cutting edge, and a blade housing configured to house at least one shaving blade in a transverse direction. The connecting head has one side configured to be detachably coupled with the razor cartridge. The razor handle includes a head adapter coupled with the connecting head to be rotatable about a rotational axis extending perpendicular to a transverse direction, and a grip extending from the head adapter. The restoring force provider includes one or more rotatable or rotary magnets disposed on another side of the connecting head and configured to co-rotate with the connecting head about the rotational axis, and one or more fixed magnets coupled to the razor handle and arranged such that a magnetic force is generated between the rotary magnet and the fixed magnet.

The rotary magnet and the fixed magnet are configured to be responsive to rotation of the connecting head about the rotational axis from the rest position, providing a restoring force for returning the connecting head to the rest position.

BRIEF DESCRIPTION OF THE DRAWINGS

FIG. 1 is a plan view of a razor assembly according to a first embodiment as viewed from the front of a razor handle.

FIG. 2 is a rear view of the razor assembly according to the first embodiment of the present disclosure.

FIG. 3 is a rear perspective view of the razor assembly according to the first embodiment of the present disclosure.

FIG. 4 shows a mode in which a blade housing and a head-side connecting member are coupled according to the first embodiment of the present disclosure.

FIG. 5 is an exploded perspective view of a razor assembly according to the first embodiment of the present disclosure.

FIG. 6 is a perspective view of the razor assembly with a longitudinal portion of the razor handle removed according to the first embodiment of the present disclosure.

FIG. 7 is a cross-sectional view showing the shape of a razor assembly with a connecting head being in the rest position according to the first embodiment of the present disclosure.

FIG. 8 is a plan view showing the shape of the razor assembly when the connecting head is in a rotated position according to the first embodiment of the present disclosure.

FIG. 9 is a cross sectional view showing the shape of a razor assembly with a connecting head being in a rest position according to the second embodiment of the present disclosure.

FIG. 10 shows lines of magnetic force acting between a rotatable magnet or rotary magnet and a fixed magnet according to the second embodiment of the present disclosure.

FIG. 11 is a perspective cross-sectional view of a pivot space of a connecting head and a rotary magnet accommodated therein according to the second embodiment of the present disclosure.

FIG. 12 is a perspective view of the magnet housing and a fixed magnet housing therein according to the second embodiment of the present disclosure.

FIG. 13A is a plan view of a razor assembly according to a third embodiment of the present disclosure as seen from the front of the razor handle, FIG. 13B is a rear view of the razor assembly shown in FIG. 13A, and FIG. 13C is a rear perspective view of the razor assembly shown in FIGS. 13A and 13B.

FIG. 14 is an exploded perspective view of the razor assembly of FIG. 13A.

FIG. 15 is a plan view showing the shape of the razor assembly with a connecting head being in the rotated position.

FIG. 16A is a plan view of a razor assembly according to a fourth embodiment of the present disclosure as viewed from the front of the razor handle, FIG. 16B is a rear view of the razor assembly shown in FIG. 16A, and FIG. 16C is a rear perspective view of the razor assembly shown in FIGS. 16A and 16B.

FIGS. 17A to 17C are exploded perspective views of the razor assembly of FIG. 16A viewed from different directions.

FIG. 18 is a perspective view of a razor assembly in which a longitudinal part of a second receiving member is removed.

FIG. 19A is a plan view showing the shape of the razor assembly of FIG. 18 when the connecting head is in the rest position and FIG. 19B is a plan view showing the shape of the razor assembly of FIG. 18 when the connecting head is in the rotated position.

FIG. 20 is a rear perspective view of a razor assembly according to a fifth embodiment of the present disclosure.

FIG. 21A and FIG. 21B are exploded perspective views of the razor assembly of FIG. 20 viewed from different directions.

FIGS. 22A through 22C are plan and perspective views of laterally cut first and second receiving members of a razor assembly.

FIG. 23A is a plan view of the shape of a razor assembly with a connecting head being in the rest position and FIG. 23B is a plan view showing the shape of the razor assembly when the connecting head is in the rotated position.

FIG. 24 shows an arrangement of three magnets for providing the repulsive force between adjacent magnets.

FIG. 25A is a plan view of a razor assembly according to a sixth embodiment of the present disclosure as viewed from the front of a blade housing, FIG. 25B is a rear view of the razor assembly shown in FIG. 25A, and FIG. 25C is a rear perspective view of the razor assembly shown in FIGS. 25A and 25C.

FIG. 26 is an exploded perspective view of the razor assembly of FIG. 25A.

FIG. 27A is a plan view showing the shape of the razor assembly with a connecting head being in the rest position and FIG. 27B is a plan view showing the shape of the razor assembly when the connecting head is in the rotated position.

FIG. 28 is a perspective view of a razor assembly according to a seventh embodiment of the present disclosure, as viewed from one side of the rear of a blade housing.

FIG. 29A is an exploded perspective view of the razor assembly of FIG. 28 and FIG. 29B is a plan view of an exploded perspective view of the razor assembly of FIG. 29A as viewed from the rear.

FIG. 30A and FIG. 30B are perspective and plan views showing the shape of the razor assembly with a connecting head being in a rest position and FIG. 30C is a plan view showing the shape of the razor assembly when the connecting head is in the rotated position.

FIG. 31 is an exploded rear perspective view of a razor assembly according to an eighth embodiment of the present disclosure, as viewed from one side of a blade housing.

FIG. 32A and FIG. 32B are perspective and plan views showing the shape of the razor assembly with a connecting head being in a rest position and FIG. 32C is a plan view showing the shape of the razor assembly when the connecting head is in the rotated position.

FIG. 33 shows a stopper of the razor assembly according to the eighth embodiment of the present disclosure.

DETAILED DESCRIPTION

At least one embodiment of the present disclosure seeks to provide a razor assembly capable of providing a rotational movement about the rotation axis perpendicular to the axis parallel to the arrangement direction of the shaving blades.

The present disclosure also seeks to provide a razor assembly which has a simpler structure for generating the rotational movement about the rotation axis, and does not deform even after a prolonged use.

The technical problems addressed by the present disclosure are not limited to those mentioned above and other unmentioned technical problems may be clearly understood by those skilled in the art from the description below.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary.

FIG. 1 is a plan view of a razor assembly 100 according to the first embodiment of the present disclosure as viewed from the front of a razor handle 3 0. Here, the front of the razor handle 30 refers to the working surface of the blade housing 10.

As shown in FIG. 1, the razor assembly 100 includes a razor cartridge 6, a connecting head 20 and a razor handle 30.

The razor cartridge 6 includes a blade housing 10, a guard bar 1, a lubricating band 3, one or more shaving blades 5 and clips 7*a*, 7*b*.

At one end of the shaving blade 5, a cutting edge is formed to be used in cutting of the user's hair, and the other end of the shaving blade 5 is configured to be housed in a seat (not shown) formed in blade housing 10. The at least one shaving blade 5 may also be accommodated in the seat of the blade housing 10.

The shaving blade 5 is housed in the seat in the transverse direction d1 perpendicular to the shaving direction. Here, the shaving direction means the direction in which the blade housing 10 moves along the skin of the user when the user shaves the hair with the razor assembly 100.

The shaving blade 5 may be an integrated blade or a welded blade.

An integrated blade includes a base, a bend, and a cutting portion. In the integrated blade, the base, bend, and cutting portion are integrally formed.

The base is housed in the seat of the blade housing 10, and the bend extends along a bent line from the base. One end of the cutting portion extends from the bend, and the other end of the cutting portion is provided with a cutting edge.

A welded blade includes a metal support and a cutting portion. In the welded blade, the metal support and the cutting portion are constructed as separate parts.

The metal support includes a base accommodated in the seat of the blade housing 10, and a bend extending along a bent line from the base. One end of the cutting portion is welded to the bend, and the other end of the cutting portion is provided with a cutting edge.

The shaving blade 5 is generally an integrated blade or a welded blade, but the present disclosure is not limited thereto. For example, the shaving blade 5 may be straight blade that does not include a bent area.

The shaving blade 5 may be made of a material such as stainless steel, metal alloy or ceramic.

The clips 7*a*, 7*b* secure both ends of the cutting edge of the shaving blade 5 to the blade housing 10. This can prevent the shaving blade 5 from being separated from the blade housing 10.

The clips 7*a*, 7*b* are generally made of a metallic material such as aluminum, but the present disclosure is not limited thereto. For example, the clips 7*a*, 7*b* may be made of a material such as synthetic resin, synthetic fiber, or ceramic.

The clips 7*a*, 7*b* are configured to have their respective one edges inserted into a through hole (not shown) formed in the cartridge frame, and have their respective other ends surround the respective sides of the blade housing 10, wrapping the cutting edge of the shaving blade 5.

However, the method of fixing the shaving blade 5 via the clips 7*a*, 7*b* is not limited to this. For example, the clips 7*a*, 7*b* may have both of their edges configured so as to respectively surround both sides of the blade housing 10, or have both of their edges penetrate through holes formed in the blade housing 10, respectively. Further, no separate fixing members are required such as clips 7*a*, 7*b*, and instead both side portions of the shaving blade 5 may be fixed by being clamped in fixing grooves (not shown) formed on the blade housing 10, respectively.

The guard bar 1 is arranged on the underside of the blade housing 10 so that it can come into contact with the user's skin before the shaving blade 5 can when shaving. As a result, the guard bar 1 may pull the user's skin in the direction of shaving before the hair is cut by the shaving blade 5.

By pulling the user's skin with the guard bar 1, the user's hair can stand up in a direction perpendicular to the skin surface of the user, to facilitate cutting of the hair with the shaving blade 5.

The guard bar 1 may be made of plastic or rubber, but is not limited thereto. For example, the guard bar 1 may have a form in which a rubber part is partially formed on a frame made of a plastic material.

Lubricating band 3 serves to smoothen the skin roughened by the cutting operation and to facilitate the glide of the razor assembly 100 by applying a lubricant material to the user's skin after cutting.

The lubricating band 3 may be made of a flexible material, a porous material having moisture absorption capability or a shaving aid.

The lubricating band 3 can expand when exposed to water, and can provide the user's skin with a water-soluble substance containing a lubricating component, a skin soothing component and the like.

Although the lubricating band 3 is illustrated as being disposed on the upper side of the blade housing 10, the present disclosure is not limited thereto. For example, the lubricating band 3 may be located adjacent to the guard bar 1 on the lower side of the blade housing 10, and may be placed on both the upper side and the lower side of the blade housing 10.

The razor handle 30 includes a head adapter 32 and a grip 33.

The head adapter 32 is a region connected to the connecting head 20 on the razor handle 30. The head adapter 32 has a housing space (E in FIG. 5) for accommodating the connecting head 20.

The grip 33 is an area that the user can grasp on the razor handle 30. The grip 33 extends from the head adapter 32.

Although the razor handle 30 may be formed as one body, it is not so limited. For example, the razor handle 30 may be formed of multiple longitudinal splits.

The connecting head 20 is configured to be received in the head adapter 32, and to be rotatable about the second axis ax2.

FIG. 2 is a rear view of the razor assembly 100 according to the first embodiment of the present disclosure, as viewed from the rear of the razor handle 30.

As shown in FIG. 2, one end of the connecting head 20 is detachably coupled with the blade housing 10 on the backside of the blade housing 10.

The blade housing 10 can rotate about the first axis ax1 with respect to the one end of the connecting head 20. The first axis ax1 is substantially parallel to the transverse direction d1 which is the orientation of the shaving blades 5.

FIG. 3 is a rear perspective view of the razor assembly 100 according to the first embodiment of the present disclosure.

As shown in FIG. 3, the connecting head 20 is rotatably coupled to the head adapter 32 about the second axis ax2.

The second axis ax2 is perpendicular to both the transverse direction d1 and the longitudinal direction d2. Here, the longitudinal direction d2 is defined to be perpendicular to both the direction of the second axis ax2 and the transverse direction d1, when the connecting head 20 is in its rest position.

Although the longitudinal direction d2 is illustrated as being parallel to the direction in which the grip 33 extends, the present disclosure is not limited thereto. In some embodiments, the grip 33 extends from the head adapter 32 to have a predetermined curvature for ease of use, in which case the second axis ax2 is perpendicular to the transverse direction d1, but not to the direction in which the grip 33 extends.

FIG. 4 is a perspective view showing a mode in which the blade housing 10 and the head-side connecting member 21 are coupled according to the first embodiment of the present disclosure.

As shown in FIG. 4, the connecting head 20 includes a head-side connecting member 21, and the razor cartridge 6 includes a housing-side connecting member 13.

The head-side connecting member 21 is disposed at one end of the connecting head 20 and can rotate within a predetermined angular range about the first axis ax1.

The housing-side connecting member 13 is arranged on the back side of the blade housing 10, and includes a coupling area F to which the head-side connecting member 21 may be coupled.

The housing-side connecting member 13 may be formed as a member separate from the blade housing 10, where the housing-side connecting member 13 and the blade housing 10 may be fastened so that they do not move relative to each other. However, the present disclosure is not so limited, and the housing-side connecting member 13 and the blade housing 10 may be formed integrally.

The head-side connecting member 21 may be inserted into the coupling area F of the housing-side connecting member 13, where the two members are coupled against mutual movement. Accordingly, the razor cartridge 6 is responsive to the rotation of the head-side connecting member 21 about the first axis ax1, for co-rotating with the housing-side connecting member 13 within a predetermined angular range.

However, the rotational structure of the razor cartridge 6 with the first axis ax1 as the center is not limited thereto.

For example, the first axis ax1 may be located on the razor cartridge 6 rather than the connecting head 20. In this case, the housing-side connecting member 13 may be coupled to the blade housing 10 so as to be rotatable about the first axis ax1, and the head-side connecting member 21 may be immovably fixed to the head 20.

In this case, the housing-side connecting member 13 can rotate, when coupled with the head-side connecting member 21, about the first axis ax1 with respect to the blade housing 10, and thereby enables the razor cartridge 6 to rotate about the first axis ax1 with respect to the handle 30.

The head-side connecting member 21 is illustrated as being coupled to the housing-side connecting member 13 by inserting lateral protrusions formed on both sides of the head-side connecting member 21 in lateral openings (not shown) formed on both side walls of the coupling area F, but the present disclosure is not limited thereto.

For example, the coupling between the head-side connecting member 21 and the housing-side connecting member 13 may be achieved by fixedly inserting longitudinal protrusions protruding from the connecting head 20 in the longitudinal direction d2, in longitudinal openings formed on the coupling area F.

FIG. 5 is an exploded perspective view of the razor assembly 100 according to the first embodiment of the present disclosure.

As shown in FIG. 5, disposed coaxially with the second axis ax2 is a fastening member 50 configured to penetrate all the way through holes 3241*a*, 3241*b* formed in the razor handle 30 and through holes 1221*a*, 1221*b* formed in the connecting head 20. The connecting head 20 can pivot about the second axis ax2, when the fastening member 50 passes through the connecting head 20 and the razor handle 30.

Although the fastening member 50 generally has a shape of a fixing pin, it is not limited thereto. For example, the fastening member 50 may also be a shaft-shaped member that allows for a rotational motion between the connecting head 20 and the razor handle 30.

Although the shaft of the connecting head 20 is illustrated as being implemented by a dedicated shaft member such as the fastening member 50, the present disclosure is not limited thereto. For example, the shaft of the connecting head 20 may be provided by a shaft-shaped member protruding from the head adapter 32, passing through a through hole of the connecting head 20. On the contrary, a shaft-shaped member protruding from the connecting head 20 may penetrate a through hole of the head adapter 32.

The razor assembly 100 includes a restoring force provider 4 which is composed of a rotary magnet 40 and a fixed magnet 45.

The restoring force provider 4 is configured to provide, when the connecting head 20 rotates about the second axis ax2 from the neutral or rest position, a restoring force for returning the connecting head 20 to the rest position by utilizing attractive magnetic force acting between the rotary magnet 40 and the fixed magnet 45.

The first embodiment of the present disclosure illustrates the attractive magnetic force acting between the rotary magnet 40 and the fixed magnet 45, but another embodiment of the present disclosure utilizes repulsive magnetic force acting between the rotary magnet 40 and the fixed magnet 45.

The rotary magnet 40 is housed in a pivot space G formed on the other side of the connecting head 20. The rotary magnet 40 is responsive to a rotation of the connecting head 20 about the second axis ax2, for co-rotating with the connecting head 20 about the second axis ax2.

Although the pivot space G is illustrated as being formed on the connecting head 20, the present disclosure is not limited thereto. For example, the pivot space G may be formed in a separate receiving member (not shown), wherein the rotary magnet 40 is received in the receiving member as well as mounted on the connecting head 20.

In addition, the connecting head 20 is illustrated as being composed by two sections divided in the longitudinal direction d2 to accommodate the rotary magnet 40 in the pivot space G, although the present disclosure is not limited thereto, and it can also be configured as a single unit.

The fixed magnet 45 is fixedly arranged on the razor handle 30. Specifically, the fixed magnet 45 is arranged on the razor handle 30 such that when the connecting head 20 is in the rest position, it exerts an attractive force to the rotary magnet 40 in the longitudinal direction d2 perpendicular to both the transverse direction d1 and the direction of the second axis ax2.

The fixed magnet 45 is accommodated and fixed in a housing space H of the razor handle 30. Specifically, the fixed magnet 45, being accommodated in a magnet housing 49, is detachably housed in the housing space Hof the razor handle 30.

The magnet housing 49 includes a magnet seat or magnet receiving portion 492 and a plug 494 extending from the magnet seat 492.

The magnet receiving portion 492 is configured to accommodate the fixed magnet 45.

With the magnet housing 49 being inserted in the housing space H, the plug 494 may be configured to depress both side walls of the housing space H, whereby fixing the magnet housing 49 within the housing space H. To this end, the plug 494 may be made of an elastic material such as plastic.

The plug 494 may include protrusions 4922 (FIG. 7) extending from one end of the plug 494. The protrusions 4922 may be configured, with the magnet housing 49 being inserted in the housing space H, to securely hook onto handle-side locking steps 35 (FIG. 7) formed on both side walls of the housing space H.

The grip 33 may include a lid member 332.

With the lid member 332 separated from the grip 33, the magnet housing 49 may be inserted in or removed from the housing space H. This, in effect, facilitates replacement and maintenance of the fixed magnet 45.

For example, the user can exchange for another fixed magnet having different magnetic force according to his/her preference, whereby the rotational strength of the connecting head 20 may be adjusted.

The method of adjusting the rotational strength of the connecting head 20 may include using fixed magnets 45 having different materials, changing the size and shape of the fixed magnet 45, or adjusting the clearance between the rotary magnet 40 and the fixed magnet 45.

To adjust the clearance between the rotary magnet 40 and the fixed magnet 45, they may be configured to be movable within the razor assembly 100 in the longitudinal direction d2.

For example, the plug 494 of the magnet housing 49 may be configured to be selectively fitted and fixed to a plurality of handle-side locking steps 35 configured in multiple stages along the longitudinal direction d2. Alternatively, the housing space H may provide a rail member formed in the longitudinal direction d2, along which the magnet housing 49 slides. However, the present disclosure is not limited to these configurations.

The material forming the rotary magnet 40 and the fixed magnet 45 includes all the substances that cause attractive magnetic force to act between the rotary magnet 40 and the fixed magnet 45.

Therefore, both the rotary magnet 40 and the fixed magnet 45 may be permanent magnets, which, however, is not a limitation. For example, in the first embodiment using attractive magnetic force, either one of the rotary magnet 40 and the fixed magnet 45 is a permanent magnet, and the other may be a magnetic metal.

Here, the magnetic metal means a substance to which an attractive magnetic force may be exerted by a permanent magnet. It is desirable but not necessary that ferromagnetic metal such as iron, cobalt and nickel be used as the magnetic metal. Therefore, a substance other than the above-mentioned metal may be used as the magnetic metal as long as it is a substance on which an attractive magnetic force acts by the permanent magnet.

In addition, the permanent magnets used for the rotary magnet 40 and the fixed magnet 45 may be replaced with an electromagnet that functions as a magnet only when a current flows. In this case, a battery capable of supplying an electric current to the electromagnet may be built in the connecting head 20 or the handle 30.

Although the rotary magnet 40 and the fixed magnet 45 are illustrated as having a cylindrical shape, they are not limited thereto. For example, the rotary magnet 40 or the fixed magnet 45 may also have a spherical shape or other shapes.

The rotational structure using the magnetic force according to the first embodiment of the present disclosure is simpler and more reliable compared with the rotational structure employed by the conventional multiaxial rotational razor, for example, the rotational structure using the cantilever.

For example, in the conventional cantilever system, the cantilever is made of an elastic member such as a leaf spring in order to impart the restoring force to the cantilever. Prolonged use of these elastic members is susceptible to deformation or wear issues, resulting in degeneration of restoring force of the cantilever. On the contrary, the rotational structure using the magnetic force according to the first embodiment of the present disclosure has an advantage that a certain restoring force can be permanently provided even after long-term use.

In addition, the rotational structure using the magnetic force according to the first embodiment positively provides a smoother pivot over the conventional cantilever system, by using the magnetic force acting between the permanent magnets (or between the permanent magnet and the magnetic metal) as restoring force, rather than the elastic force of the elastic member.

Further, in the conventional cantilever method, the elastic member constituting the cantilever is responsible for the restoring force, making it difficult to adjust the magnitude of the restoring force according to the user's preference. On the contrary, the rotational structure using the magnetic force according to the first embodiment allows the magnitude of the restoring force to be easily adjusted by changing the size, shape, or material of the magnet, or by adjusting the clearance between the magnets.

FIG. 6 is a perspective view of the razor assembly 100 with a longitudinal portion of the razor handle 30 removed according to the first embodiment of the present disclosure.

As shown in FIG. 6, the single rotary magnet 40 is arranged, in its rest position, to face the single fixed magnet 45 in the longitudinal direction d2.

In the first embodiment of the present disclosure, the rotary magnet 40 and the fixed magnet 45 may be arranged so that attractive magnetic forces act on each other. With attractive magnetic force acting between the rotary magnet 40 and the fixed magnet 45, such an arrangement can be implemented that the single rotary magnet 40 and the single fixed magnet 45 can pivot from their mutually opposite home positions to the opposite rotational directions.

Although the rotary magnet 40 and the fixed magnet 45 are each illustrated as singular, the present disclosure is not limited to this. For example, two or more of the rotary magnet 40 or the fixed magnet 45 may be provided.

With a plurality of rotary magnets 40 or fixed magnets 45 provided, the attractive magnetic forces between the rotary magnets 40 and the fixed magnets 45 are desirably symmetrical about the rest position of the connecting head 20. Therefore, the multiple rotary magnets 40 or the multiple fixed magnets 45 may be disposed symmetrically with respect to the rest position of the connecting head 20.

In this case, the multiple rotary magnets 40 or the multiple fixed magnets may form one group as a whole, functioning as if they were a single magnet.

FIG. 7 is a cross-sectional view showing the shape of the razor assembly 100 when the connecting head is in the rest position according to the first embodiment of the present disclosure.

As shown in FIG. 7, at the rest position, closer from the blade housing 10 are the second axis ax2, the rotary magnet 40, and the fixed magnet 45 in the stated order of arrangement. In addition, the rotary magnet 40 and the fixed magnet 45 are arranged face to face in the longitudinal direction d2.

Therefore, the distance between the rotation axis ax2 and the rotary magnet according to the first embodiment of the present disclosure may be made relatively short on the premise of the fixed distance between the rotation axis ax2 and the fixed magnet 45.

Relative to the case where the rotary magnet 40 is disposed not on the front side of the fixed magnet 45 but on the upper side, the lower side, or the rear side thereof, for example, the distance between the rotation axis ax2 and the rotary magnet 40 may become shorter.

Here, the front side of the fixed magnet 45 means the side of the fixed magnet 45 facing toward the second axis ax2, and the upper side of the fixed magnet 45 means the side thereof showing the back surface of the blade housing 10.

As a result, when it is assumed that the rotary magnet 40 moves over a constant span in the transverse direction d1, the pivoting angle of the connecting head 20 may be relatively greater with the rotary magnet 40 disposed on the front side of the fixed magnet than when it is disposed elsewhere.

Consequently, the arrangement of the magnets 40, 45 according to the first embodiment of the present disclosure can advantageously increase the space efficiency of the product by requiring less space to obtain the same rotational range.

In the rest position, rotational resistance may occur in the connecting head due to the attractive force between the rotary magnet 40 and the fixed magnet 45. Therefore, when a force smaller than the rotational resistance acts on the connecting head 20, the rotation of the connecting head 20 may be restricted.

The magnitude of the rotational resistance depends on the size and shape of the rotary magnet 40 and the fixed magnet 45 and the clearance between the rotary magnet 40 and the fixed magnet 45, etc., and those values may be suitably designed for actual use.

For ease of use, it is desirable that the rotational resistance is about 0.015 kgf to about 0.2 kgf, but the present disclosure is not so limited.

A surface of the connecting head 20 on its other side opposed to the fixed magnet 45 may have a curved profile P. Here, the center of the curvature radius of the curved profile P is preferably located on the second axis ax2.

With the curved profile P of one surface on the other side of the connecting head 20, the connecting head 20 is prevented, when rotating about the second axis ax2, from being brought into contact with the fixed magnet 45 or the magnet housing 49. This, in effect, smoothens the rotation of the connecting head 20.

Although one surface on the other side of the connecting head 20 is illustrated as having a curved profile, the present disclosure is not limited thereto. For example, a curved profile may be formed on the magnet housing 49 at one side opposite to the rotary magnet 40, or a curved profile may be formed on both opposing surfaces of the connecting head 20 and the magnet housing 49.

FIG. 8 is a plan view showing the shape of the razor assembly 100 when the connecting head is in the rotated position according to the first embodiment of the present disclosure.

As shown in FIG. 8, when the connecting head 20 rotates about the second axis ax2, the rotary magnet 40 may corotate with the connecting head 20 about the second axis ax2 in the clockwise or counterclockwise direction.

When the rotary magnet 40 rotates about the second axis ax2, there is an attractive magnetic force 40 acting constantly between the rotary magnet 40 and the fixed magnet 45.

As long as the force of turning the connecting head 20 is greater than the restoring force by the attraction of the rotary magnet 40 and the fixed magnet 45, the connecting head 20 will rotate within its range of rotation.

Conversely, when the force to rotate the connecting head 20 is smaller than the restoring force by attraction of the rotary magnet 40 and the fixed magnet 45, the connecting head 20 returns to the rest position from the rotated position.

The rotational range of the connecting head 20 may be limited to a specific angular range by a stopper. Specifically, when the connecting head 20 rotates, the other side of the connecting head 20 contacts a first rotation restricting portion 326, and thereby limits the rotation of the connecting head 20 to a specific angular range.

A second rotation restricting portion 13 (FIG. 1) is formed on one surface of the connecting head 20, which is not accommodated in the head adapter 32. When the connecting head 20 rotates about the second axis ax2, the second rotation restricting portion 13 contacts a restricting stepped portion 322 (FIG. 1) formed on the head adapter 32, whereby halting the rotation of the connecting head 20.

The restricting stepped portion 322 may include a curved surface and the second rotation restricting portion 13 may include a curved surface corresponding to the shape of the restricting stepped portion 322 for smooth contacting therewith. However, the present disclosure is not limited to this.

When the connecting head 20 rotates beyond the rotational range defined by the first rotation restricting portion 326, the second rotation restricting portion 13 serves to further limit the rotation of the connecting head 20. Therefore, the rotational restriction range by the second rotation restricting portion 13 may be defined larger than the rotational restriction range by the first rotation restricting portion 326.

However, the stopper structure of the connecting head 20 is not limited to this. For example, the razor assembly 100 may include only one of the first rotation restricting portion 326 and the second rotation restricting portion 13, and it may be configured to have the rotational restriction range by the first rotation restricting portion 326 to be larger than that by the second rotation restricting portion 13.

The second embodiment of the present disclosure illustrated in FIG. 9 to FIG. 12, which is described below, differs from the first embodiment of the present disclosure illustrated in FIGS. 1 to 8 in that a rotary magnet is a magnetic metal and has a spherical shape. The following focuses on distinctive features of the second embodiment of the present disclosure, and refrains from repetitive description of the configuration substantially the same as the first embodiment of the present disclosure.

FIG. 9 is a cross-sectional view showing the shape of a razor assembly 200 with a connecting head 120 being in the rest position according to the second embodiment of the present disclosure.

As shown in FIG. 9, in the second embodiment of the present disclosure, the rotary magnet 40 is made of a magnetic metal and the fixed magnet 45 is made of a permanent magnet.

It is desirable that ferromagnetic metals such as iron, cobalt and nickel be used for the magnetic metal constituting the rotary magnet 40, although the present disclosure is not limited thereto. Therefore, the magnetic metal other than the above-mentioned metals may be used for the rotary magnet 40 as long as an attraction acts thereon by the permanent magnet.

The rotary magnet 40 has a spherical shape, and the fixed magnet 45 has a cylindrical shape.

The permanent magnet has the N pole and the S pole, which makes it disadvantageous to fabricate the permanent magnet in a spherical shape in terms of the manufacturing process. For example, when a spherical permanent magnet is divided into two hemispherical regions, it is practically difficult to manufacture a permanent magnet such that each hemispherical region has exactly N pole and S pole.

Further, manufacturing the permanent magnet in a spherical shape may require an additional process in which the specific poles of the permanent magnets are arranged so as to face a specific direction, which is disadvantageous in terms of the manufacturing process.

Manufacturing the spherical shape of permanent magnet is illustrated above, but the problem with the above-mentioned permanent magnet is also applicable to manufacturing a permanent magnet having an unusual shape, for example, a hemisphere, circular cone, poly pyramid, or the like.

On the other hand, the magnetic metal has no specific pole unlike the permanent magnet. Therefore, fabricating magnetic metal in the spherical shape or other shapes may be easier than with permanent magnets.

In addition, spherical shape or others, a magnetic metal may be placed on a product requiring no procedure for arraying a specific pole to be directed to a specific direction, which is an extra advantage of the magnetic metal in terms of the manufacturing process.

Employing a magnetic metal obviates the need for the step of placing a specific pole so as to point in a specific direction, while facilitating the manufacturing thereof in non-cylindrical shapes.

Further, the magnetic metal is cheaper than the permanent magnet, which it is advantageous in terms of cost as compared with the case where both the rotary magnet 40 and the fixed magnet 45 are made of permanent magnets.

As compared with permanent magnets having the common size and common volume, the magnetic metal may have a relatively small restoring force, which is offset with the advantage of freeform fabrication in implementation.

Upon such consideration, the second embodiment of the present disclosure bases the making of the rotary magnet 40 into a spherical magnetic metal. Thereby, the second aspect of the present disclosure complements the issue of the relatively small restoring force of the magnetic metal while encompassing the advantage of the magnetic metal described above.

FIG. 10 shows lines of magnetic forces acting between a rotary magnet and a fixed magnet according to the second embodiment of the present disclosure.

Specifically, FIG. 10 shows at (a) lines of magnetic force acting between a rotary magnet 1040 and a fixed magnet 1045 both having cylindrical shapes, and FIG. 10 shows at (b) lines of magnetic force acting between a rotary magnet 40 having a spherical shape and a fixed magnet 45 having a cylindrical shape.

The rotary magnets 1040, 40 shown in FIG. 10 are both made of magnetic metal, and the fixed magnets 1045, 45 are both made of permanent magnets. Therefore, the lines of magnetic force between the rotary magnets 1040, 40 and the fixed magnet 1045, 45 are all lines of magnetic force exhibiting the attractive magnetic force.

Additionally, for the sake of convenience of explanation, FIG. 10 illustrates that one ends of the fixed magnets 1045, 45 facing the rotary magnets 1040, 40 are N poles, while one ends of the rotary magnets 1040, 40 each facing the N pole end of the fixed magnets 1045, 45 has their polarity induced by the magnetism of the fixed magnets 1045, 45 into S poles. However, the present disclosure is not limited to this, when the one end of the rotary magnets 1040, 40 and the one end of the fixed magnets 1045, 45 may have an N pole and an S pole, respectively.

Additionally, for the sake of convenience of explanation, FIG. 10 shows only the lines of magnetic force acting face to face between the rotary magnets 1040, 40 and the fixed magnets 1045, 45. Accordingly, though not illustrated in FIG. 10, it is understood that a magnetic force is exerted elsewhere between the rotary magnets 1040, 40 and the fixed magnets 1045, 45 besides their opposing faces.

As shown in FIG. 10(*a*), the rotary magnet 1040 and the fixed magnet 1045 are arranged symmetrically with respect to the center line (S) in the rest position.

As a result, the lines of magnetic force acting between the rotary magnet 1040 and the fixed magnet 1045 may also be disposed symmetrically with respect to the center line (S).

The cylindrical rotary magnet 1040 and the cylindrical fixed magnet 1045, when in the rest position, have parallel opposing faces. Therefore, the clearance between the rotary magnet 1040 and the fixed magnet 1045 is constant regardless of the distance from the center line (S).

The magnitude of the magnetic force acting between two points is inversely proportional to the square of the distance between the two points, and therefore the magnitude of the magnetic force acting between the two opposing faces of the rotary magnet 1040 and the fixed magnet 1045 is substantially constant whether it is measured in the region near the center line (S) or measured in the region away from there.

In other words, the magnetic force acting between the rotary magnet 1040 and the fixed magnet 1045 is evenly distributed between the mutually opposed faces of the rotary magnet 1040 and the fixed magnet 1045.

In this case, it is difficult to return or align a connecting head to the correct rest position when the connecting head rotates within a very small angular range from the rest position.

In FIG. 10(*b*), the rotary magnet 40 and the fixed magnet 45 are arranged symmetrically with respect to the center line (S) in a rest position.

Thus, the lines of magnetic force acting between the rotary magnet 40 and the fixed magnet 45 may also be disposed symmetrically with respect to the center line (S).

The spherical rotary magnet 40 and the cylindrical fixed magnet 45 when in a rest position, have their distance increased gradually away from the center line (S) until the distance between the rotary magnet 40 and the fixed magnet 45 is shortest on the center line (S).

Since the magnitude of the magnetic force acting between two points is inversely proportional to the square of the distance between the two points, the magnitude of the applied magnetic force between the opposing faces of the rotary magnet 40 and the fixed magnet 45 is largest in the region in the vicinity of the center line (S) and gradually decreases as it goes away from the center line (S). In other words, the magnetic force acting between the rotary magnet 40 and the fixed magnet 45 is concentrated and distributed near the center line (S).

As a result, when a connecting head rotates within a small angular range from the rest position, the attractive magnetic forces most strongly acting on the center line (S) causes the connecting head to accurately return or self-align to the rest position.

Although the rotary magnet 40 is illustrated as having a spherical shape, the present disclosure is not limited thereto. As long as the rotary magnet 40 is shaped to apply magnetic force in the rest position stronger in the vicinity of the center line (S) than when in the region away from the center line (S), such contour of the rotary magnet 40 is good to provide the merit of the present disclosure.

For example, the rotary magnet 40 may have, only in its portion facing the fixed magnet 45, the shape of partial hemisphere, circular cone, or poly pyramid.

FIG. 11 is a cross-sectional perspective view of a pivot space G of the connecting head 120 and the rotary magnet 40 housed in the pivot space G according to the second embodiment of the present disclosure.

As shown in FIG. 11, the spherical rotary magnet 40 is accommodated in the pivot space G formed on the other side of the connecting head 120.

The connecting head 120 includes a head-side opening 1222 formed on the connecting head 120 at its other side opposing the fixed magnet 45.

A part of a rotary magnet 40 accommodated in the pivot space G of the connecting head 120 may be exposed outside of the connecting head 120 via the head-side opening 1222.

On the other side of the connecting head 120 opposite the fixed magnet 45, the remaining part excluding the head-side opening 1222 may provide a head-side locking step 122.

The other unexposed part of the rotary magnet 40 of the head-side opening 1222 is configured to abut the head-side locking step 122. This prevents the rotary magnet 40 under the attractive magnetic force from passing through the head-side opening 1222 before it breaks free from the connecting head 120.

With the rotary magnet 40 partially exposed through the head-side opening 1222, the rotary magnet 120 may come closer to the fixed magnet 45 in the longitudinal direction d2, whereby increasing the attractive magnetic force acting between the rotary magnet 40 and the fixed magnet 45.

In addition, with the rotary magnet 40 partially exposed externally through the head-side opening 1222, the rotary magnet 40 and the fixed magnet 45 may keep their inter-space unblocked by the other side of the connecting head 120. This minimizes the reduction of the attractive magnetic force due to, otherwise, blocked space between the two magnets.

As a result, the razor assembly 200 according to the second embodiment of the present disclosure includes the head-side opening 1222, so that, with the equal size or shape of the magnets 40, 45 or the equal distance between the pivot space G and a magnet housing 49, the maximum possible attraction can be provided between the rotary magnet 40 and the fixed magnet 45.

Although the rotary magnet 40 has a spherical shape and the head-side opening 1222 has a circular shape for the purpose of illustration, the present disclosure is not so limited.

For example, the rotary magnet 40 may have the shape of a hemisphere, a cone, a polygonal pyramid or other shapes, and the head-side opening 1222 may be contoured as a triangle, square, cross, or other shapes following the shape of the rotary magnet 40.

In addition, although the head-side opening 1222 is illustrated as being formed on the connecting head 120, the present disclosure is not limited thereto. For example, in some embodiments where the rotary magnet 40 is coupled to the connecting head 120 while being received in another receiving member, the head-side opening 1222 is formed on the receiving member at one side opposing the fixed magnet 45.

FIG. 12 is a perspective view of a magnet housing 49 and the fixed magnet 45 accommodated in the magnet housing 49 according to the second embodiment of the present disclosure.

As shown in FIG. 12, the cylindrical fixed magnet 45 is accommodated in a magnet housing 49. Specifically, the fixed magnet 45 is accommodated in a magnet housing portion 494 of the magnet housing 49.

The magnet housing 49 includes a housing-side opening 498 formed in the magnet housing 49 at its one side surface opposed to the rotary magnet 40.

A part of the fixed magnet 45 housed in the magnet housing portion 494 may be exposed to the outside of the magnet housing 49 through the housing-side opening 498.

The remaining part of one side of the magnet housing 49 opposed to the rotary magnet 40 excluding the housing-side opening 498 may provide a housing-side locking step 496.

The other unexposed part of the fixed magnet 45 of the housing-side opening 498 is configured to abut the housing-side locking step 496. This prevents the fixed magnet 45 under the attractive magnetic force from passing through the housing-side opening 498 before it breaks free from the magnet housing 49.

With the fixed magnet 45 partially exposed externally through the housing-side opening 498, the rotary magnet 40 and the fixed magnet 45 may keep their interspace unblocked by the one side of the magnet housing 49. This minimizes reduction of attractive magnetic force due to otherwise blocked space between the two magnets 40, 45.

Accordingly, the razor assembly 200 according to the second embodiment of the present disclosure includes the housing-side opening 498, so that, with the equal size or shape of the magnets 40, 45 or the equal distance between the pivot space G and the magnet housing 49, the maximum possible attraction can be provided between the rotary magnet 40 and the fixed magnet 45.

The housing-side opening 498 is illustrated as having a cross shape, but the present disclosure is not limited thereto. For example, the housing-side opening 498 may also have a polygonal shape, such as a circular shape, a triangle, a square or other shapes.

FIG. 13A is a plan view of a razor assembly 300 according to the third embodiment of the present disclosure as viewed from the front of a razor handle 230 (the side where the front of the blade housing 10 is visible), FIG. 13B a rear view of the razor assembly 300, and FIG. 13C is a rear perspective view of the razor assembly 300.

The razor assembly 300 according to the third embodiment of the present disclosure includes a razor cartridge including a shaving blade 5, a blade housing 10, and includes a connecting head 220 and a razor handle 230. The shaving blade 5 has one end provided with a cutting edge, and the other end seated on a seat provided in the blade housing 10. Here, the shaving blade 5 is housed in the blade housing 10 in the transverse direction d1 perpendicular to the shaving direction. In addition, the structure of the blade housing 10 is the same as that of FIG. 1, and duplicate explanation will be omitted.

In FIG. 13A, the connecting head 220 is detachably coupled to the blade housing 10 at a back side 12 of the blade housing 10. Here, the blade housing 10 can rotate with respect to the one end of the connecting head, about the first axis ax1 extending in parallel with the transverse direction d1 in which the shaving blade 5 is housed.

Meanwhile, the connecting head 220 is also coupled to the razor handle 230 at the opposite end so as to be rotatable with respect to a rotation axis ax2 perpendicular to the transverse direction d1. The rotation axis, i.e., second axis ax2 is formed in a direction perpendicular to both the transverse direction d1 and the longitudinal direction d2. Such linkage is established by a fastening member 50 that passes through both the connecting head 220 and the razor handle 230 at the position of the second axis ax2. The fastening member 50 may be implemented as a fixing pin, but it is not limited thereto, and encompasses a shaft-shaped member that allows for a rotational motion between the connecting head 220 and the razor handle 230.

FIG. 14 is an exploded perspective view of the razor assembly 300 of FIG. 13A. Here, the blade housing 10 and the connecting head 220 are shown connected to each other.

The connecting head 220 is rotatably coupled to the razor handle 230 by the fastening member 50. The razor handle 230 may be formed integrally as shown in FIG. 14, although it may be made of two receiving members divided longitudinally. The razor handle 230 provides a housing space 231 for accommodating a pivoting member 224 of the connecting head 220. Specifically, the pivoting member 224 may be coupled to the inside of a shoulder 236 formed in the housing space 231. Then, the fastening member 50 passes at the position of the second axis ax2, all the way through holes 234*a*, 234*b* of the razor handle 230 and a through hole 222 (FIG. 15) formed in the connecting head 220.

FIG. 15 is a plan view showing the shape of the razor assembly 300 when the connecting head 220 is in the rotated position. Here, for inspection of the inside, the razor handle 230 is illustrated in a longitudinal cutaway view. As described above, the connecting head 220 is formed with a pivoting member 224 at its end opposite to the blade housing 10. The pivoting member 224 has a receiving recess 225 for accommodating a rotary magnet 40, and the razor handle 230 has a receiving recess 235 for accommodating a fixed magnet 45 on the inner side thereof where the housing space 231 is formed. Therefore, in the rest position, the rotary magnet 40 and the fixed magnets 45 are accommodated in the respective receiving recesses 225, 235, and are spaced apart so as to face each other in a direction parallel to the longitudinal direction d2. In other words, the direction in which the rotary magnet 40 and the fixed magnet 45 are arranged facing each other is in parallel with the second axis ax2. Here, the rotary magnet 40 and the fixed magnet 45 are in a facing arrangement, which means that the magnets 40, 45 are arranged side by side such that the wide surfaces thereof face each other. At this time, when measured from the blade housing 10, the distance to the position of the second shaft ax2 at which the fastening member 50 is fastened is shorter than that to the position of the pivoting member 224 or the rotary magnet 40.

When the connecting head 220 rotates, the rotary magnet 40 rotates clockwise or counterclockwise about the second axis ax2 from its opposing rest position, moving away from the fixed magnet 45. At this time, the opposite polarities between the rotary magnet 40 and the fixed magnet 45 generate attractive magnetic force acting therebetween. Accordingly, the pivoting member 224 equipped with the rotary magnet 40 and the connecting head 220 return to the rest position.

When the pivoting member 224 thus makes a rotational motion in the housing space 231, its rotational range is limited within a specific angle by a stopper. This is intended to limit the rotational range about the second axis ax2 within a comfort range against inducing discomfort to the user when shaving, which serves as a stopper. The stopper function is offered in this embodiment by causing the stepped pivoting member 224 to contact the shoulder 236. However, this does not limit the present disclosure, where the pivoting member 224 may be limited by both side walls of the housing space 231 of the razor handle 230.

FIG. 16A is a plan view of a razor assembly 400 according to the fourth embodiment of the present disclosure as viewed from the front of the razor handle 330, FIG. 16B is a rear view of the razor assembly 400, and FIG. 16C is a rear perspective view of the razor assembly 400.

The razor assembly 400 according to the fourth embodiment includes a blade housing 10, a connecting head 320 and a razor handle 330. Here, the shaving blade 5 is housed in the blade housing 10 in the transverse direction d1 perpendicular to the shaving direction. In addition, the structure of the blade housing 10 is the same as that of FIG. 1, and redundant description will be omitted.

In FIG. 16A, the connecting head 320 is detachably coupled to the blade housing 10 at a back side of the blade housing 10. Here, the blade housing 10 can rotate with respect to the one end of the connecting head 320 about the first axis ax1 extending in parallel with the transverse direction d1 in which the shaving blade 5 is housed.

Meanwhile, the connecting head 320 is also coupled to the razor handle 330 at its opposite end so as to be rotatable with respect to the rotation axis ax2 perpendicular to the transverse direction d1. The rotation axis, i.e., second axis ax2 is formed in a direction perpendicular to both the transverse direction d1 and the longitudinal direction d2. Such linkage is established by a fastening member 50 that passes through both the connecting head 320 and the razor handle 330 at the position of the second axis ax2. The fastening member 50 may be implemented as a fixing pin, but it is not limited thereto, and encompasses a shaft-shaped member that allows for a rotational motion between the connecting head 320 and the razor handle 330.

FIGS. 17A to 17C are exploded perspective views of the razor assembly 400 of FIG. 16A viewed from different directions. Here, the blade housing 10 and the connecting head 320 are shown in a mutually coupled state.

On the opposite side of the blade housing 10, the connecting head 320 is pivotally connected to the razor handle 330 by the fastening member 50. Although the razor handle 330 may be formed integrally, this embodiment illustrates that it is made of two receiving members 330*a*, 330*b* divided longitudinally.

The first and second receiving members 330*a*, 330*b* that constitute the razor handle 330 provide housing spaces 338*a*, 338*b* for accommodating a pivoting member 324 of the connecting head 320.

Specifically, the pivoting member 324 may be coupled to the inside of a shoulder 336 formed in the housing spaces 338*a*, 338*b*. Then, the fastening member 50 passes at the position of the second axis ax2, all the way through holes 334*a*, 334*b* of the razor handle 330 and a through hole 222 (FIGS. 17A-17C) formed in the connecting head 320.

FIG. 18 is a perspective view of the razor assembly 400 in which a longitudinal part of the second receiving member 330*b* is removed. Here, the pivoting member 324 is coupled to the inside of the shoulder 336 formed in the housing spaces 338*a*, 338*b*. The pivoting member 324 has a receiving recess 325 for accommodating a rotary magnet 40, and the razor handle 330 has a receiving recess 335 for accommodating a fixed magnet 45 on the inner side of the shoulder 336. Therefore, in the rest position, the rotary and fixed magnets 40, are accommodated in the respective receiving recesses 325, 335, and are spaced apart so as to face each other in a direction parallel to the longitudinal direction d2. In other words, the direction in which the rotary and fixed magnets 40, 45 are arranged to face each other is in parallel with the longitudinal direction. At this time, the position of the second axis ax2 to which the fastening member 50 is fastened, the position of the fixed magnet 45 and the position of the rotary magnet 40 are arranged closer to the blade housing 10 in the stated order of arrangement.

FIG. 19A is a plan view showing the shape of the razor assembly 400 of FIG. 18 when the connecting head 320 is in a rest position. FIG. 19B is a plan view showing the shape of the razor assembly 400 of FIG. 18 when the connecting head 320 is in the rotated position.

As shown in FIG. 19A, the rotary magnet 40 and the fixed magnet 45 are arranged to face in the longitudinal direction d2 at the rest position. Here, since the rotary and fixed magnet 40, 45 have the same polarity, they exert mutual repulsive forces.

As shown in FIG. 19B, when the connecting head 320 rotates, the rotary magnet 40 moves clockwise or counterclockwise about the second axis ax2 from its opposite rest position.

At this time, a part of the rotary magnet 40 gets closer to the fixed magnet 45, while some other part of the rotary magnet 40 moves away from the fixed magnet 45. However, the magnitude of the magnetic force is inversely proportional to the square of the distance between magnets, and therefore the repulsive force between the magnets 40, 45 in this rotated position is increased relative to the repulsive force between the magnets 40, 45 at the rest position. Therefore, the pivoting member 324 having the rotary magnet 40 and the connecting head 320 return to the rest position.

When the pivoting member 324 thus makes a rotational motion in the housing spaces 338*a*, 338*b*, the rotational range thereof is limited within a specific angle by a stopper. This is intended to limit the rotational range about the second axis ax2 within a comfort range against inducing discomfort to the user when shaving, which serves as a stopper. The stopper function is offered in the present embodiment by causing the pivoting member 324 when rotating, to contact both side walls forming the housing spaces 338*a*, 338*b*. However, the present disclosure is not limited thereto, and the pivoting member 324 may be brought into contact with the shoulder 336 of the razor handle 330.

FIG. 20 is a rear perspective view of a razor assembly 500 according to the fifth embodiment of the present disclosure as viewed from one side thereof. The razor assembly 500 according to the fifth embodiment of the present disclosure includes a blade housing 10, a connecting head 420 and a razor handle 430.

Here, the direction in which the shaving blade 5 is housed in the blade housing 110 is the transverse direction d1 perpendicular to the shaving direction. In addition, the structure of the blade housing 10 is the same as that of FIG. 1, and redundant description will be omitted.

In FIG. 20, the connecting head 420 is detachably coupled to the blade housing 10 at a back side of the blade housing 10. Here, the blade housing 10 can rotate with respect to the one end of the connecting head, about the first axis ax1 extending in parallel with the transverse direction d1 in which the shaving blade 5 is housed.

Meanwhile, the connecting head 420 is also coupled to the razor handle 430 at its opposite end so as to be rotatable with respect to the rotation axis ax2 perpendicular to the transverse direction d1. The second axis ax2 is formed in a direction perpendicular to both the transverse direction d1 and the longitudinal direction d2. Such linkage is established by a fastening member 50 that passes through both the connecting head 420 and the razor handle 430 at the position of the second axis ax2. The fastening member 50 may be implemented as a fixing pin, but it is not limited thereto, and encompasses a shaft-shaped member that allows for a rotational motion between the connecting head 420 and the razor handle 430.

FIG. 21A and FIG. 21B are exploded perspective views of the razor assembly 500 of FIG. 20 viewed from different directions. Here, the blade housing 10 and the connecting head 420 are shown in an intercoupled state.

On the opposite side of the blade housing 10, the connecting head 420 is pivotally connected to the razor handle 430 by the fastening member 50. Although the razor handle 430 may be formed integrally, the present embodiment illustrates that it is made of two longitudinal parts of receiving members 430*a*, 430*b*.

The first and second receiving members 430*a*, 430*b* constituting the razor handle 430 provide housing spaces 438*a*, 438*b* for accommodating a pivoting member 424 of the connecting head 420.

Specifically, the pivoting member 424 may be coupled to the inside of a shoulder 436 formed in the housing spaces 438*a*, 438*b*. Then, the fastening member 50 passes at the position of the second axis ax2, all the way through holes 434*a*, 434*b* of the razor handle 430 and a through hole 422 into its fastened position.

FIGS. 22A through 22C are a plan view and perspective views of the horizontally cut first and second receiving members 430*a*, 430*b* of the razor assembly 500.

Here, the pivoting member 424 is coupled to the inside of a shoulder 336 formed in the housing spaces 438*a*, 438*b*. The pivoting member 424 includes a receiving recess 425 for accommodating a rotary magnet 40, and the razor handle 430 has both side surfaces thereof provided with receiving recesses 435, 437 for accommodating a first fixed magnet 45 and a second fixed magnet 47.

At the rest position, the rotary and fixed magnets 40, 45, 47 are accommodated in the respective receiving recesses 425, 435, 437 and are spaced apart so as to face each other in a direction parallel to the transverse direction d1 in which the shaving blade is arranged. In other words, the direction in which the rotary and fixed magnets 40, 45, 47 are arranged facing each other is in parallel with the transverse direction d1. At this time, when measured from the blade housing 10, the position of the second shaft ax2 at which the fastening member 50 is fastened is farther than the position where the magnets 40, 45, 47 face each other.

FIG. 23A is a plan view showing the shape of the razor assembly 500 when the connecting head 420 is in the rest position. FIG. 23B is a plan view showing the shape of the razor assembly 500 when the connecting head 420 is in the rotated position. Here, the inside of the housing space 438*a* has been made visible by removing the second receiving member 430*b*.

As shown in FIG. 23A, in a rest position, a rotary magnet 40 is provided between the first fixed magnet 45 and the second fixed magnet 47 in an opposing manner to the transverse direction d1 in which the shaving blade 5 is arranged. Here, repulsive forces act both between the rotary magnet 40 and the first fixed magnet 45, and between the rotary magnet 40 and the second fixed magnet 47. Some embodiments may use such arrangement as in FIG. 13 for providing the repulsive forces exclusively between the magnets in close proximity. In the example of FIG. 24, the N poles and the S poles are formed in the fixed magnets 45, 47 in the same direction, while the rotary magnet 40 forms the N pole and the S pole in the opposite direction thereto. This generates a repulsive force due to the S-pole repulsion between the rotary magnet 40 and the first fixed magnet 45, as well as another repulsive force due to the N-pole repulsion between the rotary magnet 40 and the second fixed magnet 47.

Referring again to FIG. 23B, when the connecting head 420 rotates, the rotary magnet 40 moves from the rest position clockwise or counterclockwise about the second axis ax2. When rotating in the counterclockwise direction, the rotary magnet 40 approaches the second fixed magnet 47, increasing the repulsive force therebetween. Due to such repulsive force, when an external force is removed, the pivoting member 424 equipped with the rotary magnet 40 and the connecting head 420 will return in a clockwise rotation to the rest position. Similarly, when rotating in the clockwise direction, the rotary magnet 40 approaches the first fixed magnet 45, increasing the repulsive force therebetween. Due to such repulsive force, when an external force is removed, the pivoting member 424 equipped with the rotary magnet 40 and the connecting head 420 will return in a counterclockwise rotation to the rest position.

In the present embodiment, the repulsive force increases between the rotary magnet 40 and the other magnets 45, 47 as the rotational angle of the rotary magnet 40 increases. This provides the structural stability of the rotation about the second axis ax2 in that the returning force to the rest position increases as the connecting head 420 makes bigger swing. This provides an elastic restoring mechanism as with the typical spring structure.

Meanwhile, when the pivoting member 424 makes a rotational motion in the housing spaces 438*a*, 438*b*, its rotational range is limited within a specific angle. This is intended to limit the rotational range about the second axis ax2 within a comfort range against inducing discomfort to the user when shaving, which serves as a stopper. The stopper function is offered in the present embodiment by causing the pivoting member 424 to contact two fixed magnets 45, 47. However, this does not limit the present disclosure, where the pivoting member 424 may be caused to contact with the shoulder 436 of the razor handle 430.

The aforementioned third to fifth embodiments of the present disclosure discussed the razor assemblies 100, 200, 300, 400 and 500 with the connecting head using the attractive magnetic force or the repulsive force between the plurality of magnets, to be rotatable about the second axis ax2 perpendicular both to the transverse direction d1 in which the shaving blades are arranged and to the longitudinal direction d2. The following embodiments are in regard to razor assemblies with a connecting head using an attractive magnetic force or repulsive force between a plurality of magnets, to be rotatable about a third axis ax3 extending in parallel with the longitudinal direction d2.

FIG. 25A is a plan view of a razor assembly 600 according to the sixth embodiment of the present disclosure as viewed from the front of the blade housing 10, FIG. is a rear view of the razor assembly 600, and FIG. 25C is a rear perspective view of the razor assembly 600.

A razor assembly according to the sixth embodiment of the present disclosure includes a razor cartridge including a shaving blade 5 and a blade housing 10, a connecting head 520, and a razor handle 530. The shaving blade 5 has one end provided with a cutting edge, and the other end seated on a seat provided in the blade housing 10. Here, the shaving blade 5 is housed in the blade housing 10 in the transverse direction d1 perpendicular to the shaving direction. Further structure of the blade housing 10 is the same as that of FIG. 1, and redundant description will be omitted.

In FIG. 25A, the connecting head 520 has its one end detachably coupled to the blade housing 10 at a back side thereof. Here, the blade housing 10 can rotate with respect to the one end of the connecting head, about the first axis ax1 extending in parallel with the transverse direction d1 in which the shaving blade 5 is housed. On the other hand, formed on the other end of the connecting head 520, a central axis 529 is also joined to the razor handle 530 so as to be rotatable with respect to the rotation axis ax3 perpendicular to the transverse direction d1. In addition, the third axis ax3 is formed in a direction parallel to the longitudinal direction d2.

FIG. 26 is an exploded perspective view of the razor assembly 600 of FIG. 25A. Here, the blade housing 10 and the connecting head 520 are shown intercoupled.

On the opposite side of the blade housing 10, the central shaft 529 of the connecting head 520 is coupled to be rotatable about the third axis ax3 with respect to the razor handle 530. The razor handle 530 may be formed integrally as shown in FIG. 26, although it may be made of two longitudinal parts of receiving members. A pivoting member 524 is provided at the end of the central shaft 529, and the pivoting member 524 is formed with a receiving recess 525. The receiving recess 525 accommodates a rotary magnet 40 in the direction of the third axis ax3. When the central axis 529 is coupled with the razor handle 530, the pivoting member 524 is completely housed within the housing space of the razor handle 530. At this time, the pivoting member 524 may be coupled to the inside of a shoulder 536 (FIG. 27A) formed in the razor handle 530. In particular, the shoulder 536 of the razor handle 530 may be aligned with a stepped groove 526 formed in the pivoting member 524.

Meanwhile, centrally of the rotary magnet 40, an offset 'e' is formed by a predetermined interval between the rotation axis ax3 of both the central axis 529 and a connecting member 520 and an extension line d3 extending in a direction in which the rotary magnet 40 is arranged. In other words, to the center of the rotary magnet 40, eccentricity is established by an offset 'e' from the rotation axis ax3. The fixed magnet 45 accommodated in a receiving recess 535 (FIG. 27A) in the razor handle 530 is disposed so as to face the rotary magnet 40 at the rest position. Similarly, the fixed magnet 45 may be eccentric by offset 'e' from the rotation axis ax3. Such an offset 'e' is formed in the anterior-posterior direction of the connecting head 520, which will no longer be visible in the following FIG. 27A and FIG. 27B.

FIG. 27A is a plan view showing the shape of the razor assembly 600 when the connecting head 520 is in the rest position. FIG. 27B is a plan view showing the shape of the razor assembly 600 when the connecting head 520 is in the rotated position. Here, the interior of the housing space 538 has been made visible by removing a longitudinal part of the razor handle 530.

As shown in FIG. 27A, at a rest position, a rotary magnet 40 is disposed facing the fixed magnet 45 in the longitudinal direction d2. Here, the polarities of the rotary magnet 40 and the fixed magnet 45 are different from each other, and an attractive magnetic force acts between them.

As shown in FIG. 27B, when the connecting head 520 pivots about the third axis ax3, the pivoting member 524 rotates about the third axis ax3 clockwise or counterclockwise from the rest position. At this time, since the rotary magnet 40 is eccentric by the offset 'e' from the third axis ax3, it deviates somewhat from the position facing the fixed magnet 45.

However, with an attractive magnetic force acting between the rotary and fixed magnets 40, 45, when an external force is removed, the rotary magnet 40 will return to its own opposite position. In this way, the pivoting member 524 containing the rotary magnet and the connecting head 520 follow suit in an opposite rotational motion to return to the rest position.

Both the rotary magnet 40 and the fixed magnet 45 may be implemented by magnets as illustrated, whereas the sixth embodiment takes advantage of a mutual attraction which can be achieved by replacing one of the rotary magnet 40 and the fixed magnet 45 by a magnetic metal with which an opposing magnet can exerts attractive magnetic force. A ferromagnetic metal such as iron, cobalt and nickel may be used as the magnetic metal, although other substances than these metals may be used as the magnetic metal as long as it is a substance on which an attractive magnetic force acts by the permanent magnet.

When the pivoting member 524 makes a rotational motion in the housing space 538, the rotational range thereof is limited within a specific angle. This is intended to limit the rotational range about the third axis ax3 within a comfort range against inducing discomfort to the user when shaving, which serves as a stopper. The stopper function is offered in the present embodiment by causing the eccentric pivoting member 524 when rotating, to contact both side walls the housing space 538. However, the present disclosure is not limited thereto, and the stopper function may be well provided by other methods.

FIG. 28 is a rear perspective view of a razor assembly 700 according to the seventh embodiment of the present disclosure as viewed from one side of the blade housing 10.

The razor assembly 700 according to the seventh embodiment of the present disclosure includes a razor cartridge including a shaving blade 5 and a blade housing 10, a connecting head 620, and a razor handle 630. The shaving blade 5 has one end provided with a cutting edge, and the other end seated on a seat provided in the blade housing 10. Here, the shaving blade 5 is housed in the blade housing 10 in the transverse direction d1 perpendicular to the shaving direction. Further structure of the blade housing 10 is the same as that of FIG. 1, and redundant description will be omitted.

In FIG. 28, the connecting head 620 has its one end detachably coupled to the blade housing 10 at a back side thereof. Here, the blade housing 10 can rotate with respect to the one end of the connecting head, about the first axis ax1 extending in parallel with the transverse direction d1 in which the shaving blade 5 is housed. On the other hand, formed on the other end of the connecting head 620, a central axis 629 is also joined to the razor handle 630 so as to be rotatable with respect to the rotation axis ax3 perpendicular to the transverse direction d1. In addition, the third axis ax3 is formed in a direction parallel to the longitudinal direction d2.

FIG. 29A is an exploded perspective view of the razor assembly 700 of FIG. 28. FIG. 29B is a plan view of an exploded perspective view of the razor assembly 700 of FIG. 29A. Here, the blade housing 10 and the connecting head 620 are shown connected to each other. FIG. 29B shows the interior of the housing space 638 by removing a longitudinal part of the razor handle 630.

On the opposite side of the blade housing 10, the central shaft 629 of the connecting head 620 is coupled to be rotatable about the third axis ax3 with respect to the razor handle 630. The razor handle 630 may be formed integrally as shown in FIG. 29A, although it may be made of two longitudinal parts of receiving members. A pivoting member 624 is provided at the end of the central shaft 629, and the pivoting member 624 is formed with a receiving recess 625. The receiving recess 625 is formed in a direction d4 perpendicular to both the transverse direction d1 and the third axis ax3 to accommodate a rotary magnet 40. When the central axis 629 is coupled with the razor handle 630, the pivoting member 624 is completely housed within the housing space of the razor handle 630. At this time, a fixed magnet 45 is attached to a magnet housing portion 636 of the razor handle 63, so that the rotary magnet 40 and the fixed magnet 45 are spaced apart from each other both facing in the vertical direction d4 at the rest position.

FIG. 30A and FIG. 30B are a perspective view and a plan view, respectively, showing the shape of the razor assembly 700 when the connecting head 620 is in the rest position. FIG. 30C is a plan view showing the shape of a razor assembly 700 when the connecting head 620 is in a rotated position. Here, the interior of the housing space 638 has been made visible by removing a longitudinal part of the razor handle 630.

As shown in FIG. 30A and FIG. 30B, at the rest position, both the rotary magnet 40 and the fixed magnet 45 are disposed facing the direction d4 that is perpendicular. Here, the polarities of the rotary magnet 40 and the fixed magnet 45 are the same, and a repulsive force acts between them.

As shown in FIG. 30C, when the connecting head 620 rotates about the third axis ax3, the pivoting member 624 moves from its rest position clockwise or counterclockwise about the third axis ax3. At this time, at least a part of the rotary magnet 40 approaches the fixed magnet 45, increasing the repulsive force therebetween. Accordingly, when an external force is removed, the rotary magnet 40 subject to the repulsive force of the fixed magnet 45, returns to the initial opposing position (FIG. 30). In concert with this movement, the pivoting member 624 holding the rotary magnet 40 and the connecting head 620 return in a reverse rotation to the rest position.

When the pivoting member 624 makes a rotational motion in the housing space 638, its rotational range is limited within a specific angle. This is intended to limit the rotational range about the third axis ax3 within a comfort range against inducing discomfort to the user when shaving, which serves as a stopper. The stopper function is offered in the present embodiment by causing the eccentric pivoting member 624 when rotating, to contact with the magnet housing portion 636. However, the present disclosure is not limited thereto, and the stopper function may be well provided by other methods.

FIG. 31 is an exploded rear perspective view of a razor assembly 800 according to the eighth embodiment of the present disclosure as viewed from one side of the blade housing 10.

The razor assembly according to the eighth embodiment of the present disclosure includes a razor cartridge including a shaving blade 5 and a blade housing 10, a connecting head 720, and a razor handle 730. The shaving blade 5 has one end provided with a cutting edge, and the other end seated on a seat provided in the blade housing 10. Here, the shaving blade 5 is housed in the blade housing 10 in the transverse direction d1 perpendicular to the shaving direction. Further structure of the blade housing 10 is the same as that of FIG. 1, and redundant description will be omitted.

In FIG. 31, the connecting head 720 has its one end detachably coupled to the blade housing 10 at a back side thereof. Here, the blade housing 10 can rotate with respect to the one end of the connecting head, about the first axis ax1 extending in parallel with the transverse direction d1 in which the shaving blade 5 is housed. On the other hand, formed on the other end of the connecting head 720, a central axis 729 is also joined to the razor handle 730 so as to be rotatable with respect to the rotation axis ax3 perpendicular to the transverse direction d1. In addition, the third axis ax3 is formed in a direction parallel to the longitudinal direction d2.

The razor handle 730 may be formed integrally as shown in FIG. 31, although it may be made of two longitudinal parts of receiving members. A pivoting member 724 is provided at the end of the central shaft 729, and the pivoting member 724 is formed with a receiving recess 725. The receiving recess 725 is formed in the same direction as the longitudinal direction d1 to accommodate a rotary magnet 40. The arrangement direction of the receiving recess 725 is merely exemplary, and the receiving recess 725 may be arranged in any one of the radial directions of the central shaft 729.

When the central shaft 729 is coupled with the razor handle 730, the pivoting member 724 is completely housed within the housing space of the razor handle 730. Here, first and second fixed magnets 45, 47 are installed in magnet housing portions 736*a*, 736*b* respectively, so that the rotary magnet 40 is disposed when in the rest position between the first and second fixed magnets 45, 47 with a certain space maintained therebetween and in an opposing manner thereto.

FIG. 32A and FIG. 32B are perspective and plan views showing the shape of the razor assembly 700 when the connecting head 720 is in the rest position. FIG. 32C a plan view showing the shape of the razor assembly 700 when the connecting head 720 is in the rotated position. Here, the interior of the housing space 738 has been made visible by removing a longitudinal part of the razor handle 730.

As shown in FIGS. 32A and 32B, in a rest position, a rotary magnet 40 is provided between the first fixed magnet 45 and the second fixed magnet 47 in an opposing manner to the transverse direction d1. Here, repulsive forces act both between the rotary magnet 40 and the first fixed magnet 45, and between the rotary magnet 40 and the second fixed magnet 47. In order to cause such all repulsive forces to be generated between two adjacent magnets among the three magnets 45, 40, 47, this embodiment provides the polarity arrangement as illustrated in FIG. 24.

As shown in FIG. 32C, as the connecting head 720 pivots about the third axis ax3, the pivoting member 724 rotates clockwise or counterclockwise from the rest position about to the third axis ax3. At this time, at least a part of the rotary magnet 40 comes close to the first fixed magnet 45 as well as to the second fixed magnet 47, which accordingly increases both the repulsive force between the rotary magnet 40 and the first fixed magnet 45, and the repulsive force between the rotary magnet 40 and the second fixed magnet 47. Therefore, when an external force is removed, the rotary magnet 40 subject to the repulsive force of the first and second fixed magnets 45, 47, returns to its initial the opposing position (FIG. 32B). Accordingly, the pivoting member 724 holding the rotary magnet 40 and the connecting head 720 follow suit in a reverse rotation to return to the rest position.

When the pivoting member 724 makes a rotational motion within the housing space 738, the rotational range thereof is preferably limited within a specific angle. This is intended to limit the rotational range about the third axis ax3 within a comfort range against inducing discomfort to the user when shaving, which serves as a stopper. Although not shown in FIG. 31 to FIG. 32C, this embodiment too can offer the stopper function in such form as in FIG. 33. As shown in FIG. 33, a plurality of protrusions 728*a*, 728*b* may be formed in the circumferential direction of the central shaft 729. These protrusions 728*a*, 728*b* are accommodated in slot portions 737*a*, 737*b* which are formed in the razor handle 730 at the distal end portion thereof in the circumferential direction so as to correspond to the protrusions 728*a*, 728*b*. This provides the stopper function that controls the rotational range of the central shaft 729 as defined by the restricted movement of the protrusions within the slots.

The razor assembly according to the above described embodiments has an advantage that it can reliably and stably provide the rotational movement about the rotation axis perpendicular to the axis parallel to the arrangement direction of the shaving blades.

Further, according to the razor assembly of the above described embodiments, shaving performance may be improved by the shaving blade smoothly adhering to the skin profile of the user.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A razor assembly, comprising:

a razor cartridge including at least one shaving blade having a cutting edge and a blade housing configured to house the at least one shaving blade, wherein the razor cartridge is elongated along a longitudinal axis of the razor cartridge;

a connecting head comprising a first side movably coupled to the razor cartridge such that the razor cartridge is rotatable with respect to the connecting head about a first rotational axis parallel to the longitudinal axis of the razor cartridge;

a razor handle elongated along a longitudinal axis of the razor handle and configured to be coupled to the connecting head such that the connecting head is rotatable with respect to the razor handle about a second rotational axis perpendicular to both the longitudinal axis of the razor cartridge and the longitudinal axis of the razor handle, the razor handle further including a grip;

at least one first magnet or magnetic material coupled to a second side of the connecting head and configured to co-rotate with the connecting head about the second rotational axis; and at least one second magnet or magnetic material coupled in a housing space of the razor handle and placed opposite to the at least one first magnet or magnetic material at a neutral position in which the at least one first magnet or magnetic material, the at least one second magnet or magnetic material, and razor handle are aligned with the longitudinal axis of the razor handle, wherein the at least one first magnet or magnetic material located in the housing space of the razor handle is configured to move in a clockwise or counterclockwise direction away from the at least one second magnet or magnetic material according to a direction of the rotation of the connecting head moving away from the neutral position, and wherein a magnetic force between the at least one first magnet and the at least one second magnet or magnetic material or between the at least one second magnet and the at least one first magnet or magnetic material biases the rotated connecting head toward the neutral position.

2. The razor assembly of claim 1, wherein at least one of the at least one first magnet or magnetic material or the at least one second magnet or magnetic material has a cylindrical or spherical shape.

3. The razor assembly of claim 1, wherein the at least one second magnet or magnetic material is located closer to the blade housing than the at least one first magnet or magnetic material.

4. The razor assembly of claim 1, further comprising:

a shoulder disposed in the housing space and comprising a receiving recess configured to secure the at least one second magnet or magnetic material.

5. The razor assembly of claim 4, wherein the receiving recess is configured to expose at least a part of the at least one second magnet or magnetic material.

6. The razor assembly of claim 4, wherein the connecting head comprises a pivoting member configured to secure the at least one first magnet or magnetic material, and wherein the pivoting member is configured to be received in the housing space.

7. The razor assembly of claim 6, wherein the razor handle comprises side walls defining the housing space and configured to cause the pivoting member to stop in response to the pivoting member contacting the side walls.

8. The razor assembly of claim 1, wherein the connecting head comprises a receiving recess configured to receive at least a part of the at least one first magnet or magnetic material.

9. The razor assembly of claim 1, wherein the razor handle comprises a first receiving member and a second receiving member configured to be coupled to each other to form the housing space.

* * * * *